US010771549B2

(12) United States Patent
Allison et al.

(10) Patent No.: US 10,771,549 B2
(45) Date of Patent: Sep. 8, 2020

(54) CORRELATING A FILE HOSTED AT A FILE HOSTING SERVER WITH A MEETING OBJECT

(71) Applicant: Microsoft Technology Licensing, LLC, Redmond, WA (US)

(72) Inventors: Angela Allison, Bellevue, WA (US); Kristen Kamath, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 15/183,711

(22) Filed: Jun. 15, 2016

(65) Prior Publication Data

US 2017/0366608 A1 Dec. 21, 2017

(51) Int. Cl.
G06F 15/16 (2006.01)
H04L 29/08 (2006.01)
G06Q 10/10 (2012.01)
H04L 12/58 (2006.01)
H04L 29/06 (2006.01)

(52) U.S. Cl.
CPC ..... *H04L 67/1095* (2013.01); *G06Q 10/1095* (2013.01); *H04L 51/24* (2013.01); *H04L 67/06* (2013.01); *H04L 67/2804* (2013.01); *H04L 67/42* (2013.01)

(58) Field of Classification Search
None
See application file for complete search history.

(56) References Cited

U.S. PATENT DOCUMENTS

| 8,190,679 B1 * | 5/2012 | Gay ........................ H04L 67/34 709/204 |
| 8,954,467 B2 | 2/2015 | Christiansen |
| 2003/0217073 A1 | 11/2003 | Walther et al. |

(Continued)

FOREIGN PATENT DOCUMENTS

WO 2015096600 A1 7/2015

OTHER PUBLICATIONS

"Meeting Pad", Published on: Mar. 6, 2014, Retrieved At: <<http://www.meeting-pad.com/>>, 11 pages.

(Continued)

*Primary Examiner* — Mohamed Ibrahim
(74) *Attorney, Agent, or Firm* — Medley, Behrens & Lewis, LLC

(57) ABSTRACT

A computing system comprises at least one processor memory. The at least one processor, when executing a hosting application loaded in the memory, is configured to perform several acts. These acts include receiving data generated by a scheduling application, wherein the data indicates that a file hosted by the file hosting application is referenced in a meeting object generated by the scheduling application. The acts further include responsive to receiving the data, assigning metadata to the file hosted by the file hosting application, the metadata comprises the data generated by the scheduling application. The acts also include at a threshold time prior to the time when the meeting represented by the meeting object is to occur, causing a notification to be transmitted to a client computing device from which credentials of a user in the users have been received, the notification transmitted based upon the metadata assigned to the file.

20 Claims, 15 Drawing Sheets

(56) References Cited

U.S. PATENT DOCUMENTS

| | | | |
|---|---|---|---|
| 2004/0128362 A1 | 7/2004 | Cui et al. | |
| 2007/0271337 A1 | 11/2007 | Olson | |
| 2007/0294120 A1* | 12/2007 | Berstis | G06Q 10/06312 705/7.19 |
| 2008/0033957 A1 | 2/2008 | Forstall et al. | |
| 2011/0264745 A1 | 10/2011 | Ferlitsch | |
| 2012/0150863 A1 | 6/2012 | Fish et al. | |
| 2013/0018953 A1* | 1/2013 | McConnell | G06Q 10/10 709/204 |
| 2013/0282737 A1* | 10/2013 | Chen | H04L 67/02 707/749 |
| 2014/0195532 A1 | 7/2014 | Dheap et al. | |
| 2014/0344355 A1* | 11/2014 | Gaucas | H04L 65/1063 709/204 |
| 2014/0358613 A1 | 12/2014 | Libin | |
| 2015/0074558 A1 | 3/2015 | Haskins et al. | |
| 2015/0281148 A1 | 10/2015 | Masterson et al. | |
| 2016/0005005 A1 | 1/2016 | Dhara et al. | |
| 2016/0112476 A1 | 4/2016 | Gudipaty et al. | |

OTHER PUBLICATIONS

"Displaying Earlier Versions of Documents", Retrieved on: Apr. 25, 2016, Retrieved At: <<https://social.msdn.microsoft.com/Forums/en-US/3b73c5cf-8509-4d22-b3db-cfd7b1848ca2/displaying-earlier-versions-of-documents?forum=sharepointdevelopmentprevious>>, 2 pages.

Mekhaldi, et al., "Thematic alignment of documents with meeting dialogs", In Proceedings of 12th Annual ACM International Conference on Multimedia, Oct. 10, 2004, pp. 973-974.

"Office 365", Retrieved From<<https://en.wikipedia.org/w/index.php?title=Office_365&oldid=724602838>>, Jun. 10, 2016, 10 Pages.

Darbyshire, et al., "Getting Started with Google Apps", In Publication of APress, May 25, 2010, 272 Pages.

Teeter, et al., "Google Sites and Chrome For Dummies", In Wiley Publishing Inc., Feb. 9, 2009, 313 Pages.

Vivacqua, et al., "Using Agents to Detect Opportunities for Collaboration", In Proceedings of 9th International Conference on Computer Supported Cooperative Work in Design, May 5, 2006, pp. 246-248.

Withee, et al., "Office 365 For Dummies", In Book—For Dummies, Chapters 3 to 6, Feb. 7, 2012, 84 Pages.

International Search Report and Written Opinion Issued in PCT Application No. PCT/US2017/036657, dated Jul. 28, 2017, 12 Pages.

"G Suite", Retrieved from: https://en.wikipedia.org/w/index.php?title=G_Suite&oldid=%20719284162, Retrieved Date: Nov. 25, 2019, 13 Pages.

"Office Action Issued in European Patent Application No. 17731708.8", dated Dec. 2, 2019, 10 Pages.

Tanenbaum, et al., "Distributed Systems: Principles and Paradigms (2nd Edition)", In book of Distributed Systems: Principles and Paradigms (2nd Edition), Prentice Hall Publishing, 2007, 702 Pages.

* cited by examiner

US 10,771,549 B2

CORRELATING A FILE HOSTED AT A FILE HOSTING SERVER WITH A MEETING OBJECT

BACKGROUND

A file hosting service is a network hosting service that is designed to host user files. A file hosting service typically includes a plurality of file hosting servers, each of which execute a file hosting application. The file hosting service, therefore, facilitates hosting of files at the file hosting servers, wherein the servers are accessible to client computing devices by way of a network connection. File hosting services also facilitate syncing of files between client devices and the file hosting server. Conventional file hosting services support assignment of permissions to files retained at the file hosting server, as well as sharing files between users.

In an enterprise setting, files hosted on a file hosting server may be subject to meetings. More specifically, a user in an enterprise may employ a scheduling application (e.g., which may be or be included in an email application, a calendar application, etc.) to create a meeting object, where the meeting object (e.g., created in response to a meeting invitation being transmitted to users) includes a reference to a file hosted by the file hosting service. The meeting object represents a meeting, wherein at the time of the meeting the file is discussed. It can be understood that a single file may be involved in multiple different meetings (with multiple different attendees), and in an enterprise setting many different files may be referenced in different meetings.

Conventionally, it is difficult to identify all meeting objects where a file hosted by a file hosting service was presented. Typically, for a user in an enterprise to ascertain whether a file has been referenced in a meeting object, the user must access the scheduling application and attempt to recollect an approximate time frame when the file was discussed or is to be discussed. Further, using conventional technologies, a user in an enterprise may (unintentionally) take part in a meeting where the user is somewhat unprepared. This can occur in many different situations, such as when the user is unaware that the meeting is to be about a file, when someone else has modified the file prior to the meeting (but after the meeting object was created), and so forth. Using conventional technologies, there is no suitable mechanism for assisting the user in preparing for the meeting when the meeting is about a file hosted at a file hosting service.

SUMMARY

The following is a brief summary of subject matter that is described in greater detail herein. This summary is not intended to be limiting as to the scope of the claims.

A computing system includes at least one processor and memory that has a file hosting application loaded therein, wherein the at least one processor, when executing the file hosting application, is configured to perform several acts. These acts include receiving data generated by a scheduling application, the data indicates that a file hosted by the file hosting application is referenced in a meeting object generated by the scheduling application. The data includes identities of users referenced in the meeting object. The data also includes an identity of the file hosted by the file hosting application referenced in the meeting object. The data further includes a time when a meeting represented by the meeting object is to occur. The above-referenced acts also include, responsive to receiving the data, assigning metadata to the file hosted by the file hosting application, wherein the metadata includes the data generated by the scheduling application. The acts further include, at a threshold time prior to the time when the meeting represented by the meeting object is to occur, causing a notification to be transmitted to a client computing device from which credentials of a user in the users have been received, the notification transmitted based upon the metadata assigned to the file.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
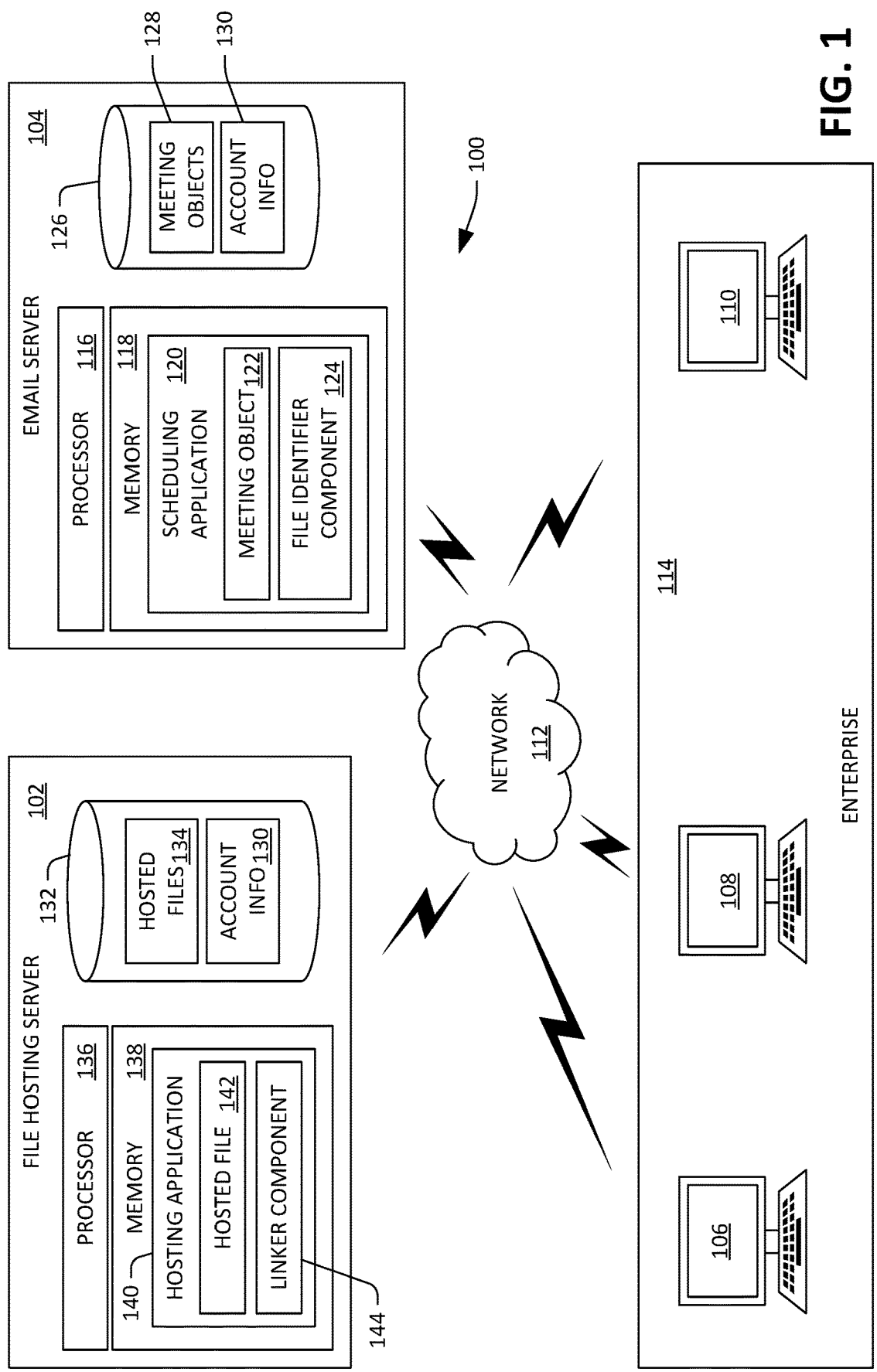
FIG. 1 is a functional block diagram of an exemplary system that facilitates correlating a file hosted at a file hosting server with a meeting object created by way of a scheduling application.

Various technologies pertaining to correlating a file hosted at a file hosting server with a meeting object that includes a reference to the file, and further proactively causing a notification to be transmitted to a user based upon such correlation, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates correlating a meeting object generated by a scheduling application with a file hosted at a file hosting server is illustrated. The system 100 includes a file hosting server 102, an email server 104, and a plurality of client computing devices 106-110, wherein the file hosting server 102, the email server 104, and the client computing devices 106-110 are in communication with one another by way of a network 112. While the devices shown in FIG. 1 are depicted as being in communication with one another by way of a single network (the network 112), it is to be understood that subsets of the computing devices may be in communication with one another by way of several networks. For instance, the client computing devices 106-110 may be in communication with the file hosting server 102 by way of the network 112, the client computing devices 106-110 may be in communication with the email server 104 by way of the network 112, and the file hosting server 102 and the email server 104 may be in communication with one another by way of a private network (which is separate from the network 112).

The client computing devices 106-110 may be devices of an enterprise 114, wherein the enterprise 114 utilizes the file hosting server 102 to host computer-readable files for the enterprise 114, and further wherein the enterprise 114 may utilize the email server 104 to provide functionality associated with email for the enterprise 114. Further, the file hosting server 102 and the email server 104 may be operated by a common entity, such that file hosting services (provided by the file hosting server 102) and email/scheduling services (provided by the email server 104) are offered as a suite of services to enterprises (including the enterprise 114).

The email server 104 includes a processor 116 and memory 118, where the memory 118 has a scheduling application 120 loaded therein. The scheduling application 120 may be or be included in an email application executing at the email server 104. In another example, the scheduling application 120 may be or may be included in a calendar application executing at the email server 104. Therefore, it is to be understood that while the system 100 is depicted as including the email server 104, such server 104 may not host an email application.

The scheduling application 120 is generally configured to create and maintain meeting objects. More specifically, a user can interact with the scheduling application 120 to create electronic meeting invitations, wherein a meeting invitation can include an electronic alias of at least one meeting invitee. The scheduling application 120 can then cause the meeting invitation to be transmitted to client computing devices operated by the invitees based upon the electronic aliases, whereupon the invited attendees may choose to accept or decline the meeting invitation. The scheduling application 120 creates a meeting object 122 in response to the invitation being transmitted to the at least one identified attendee in the meeting invitation. This meeting object 122 is an electronic data object that represents a meeting that is to occur amongst the invitees (and optionally the organizer of the meeting). Therefore, the meeting object 122 can include a date and time when the meeting is to begin, a date and time when the meeting is to end, a title (subject) of the meeting, electronic aliases of attendees of the meeting (which may be updated over time as additional attendees are invited and/or as invitees accept or decline the meeting invitation), a location of the meeting (e.g., a physical location and/or a virtual location for online meetings), and content. The content may include attachments, text, etc. Further, in an example described in greater detail herein, the content may include a link to a file hosted at the file hosting server 102.

The scheduling application 120 includes a file identifier component 124 that is configured to analyze the content in each meeting object created by the scheduling application 120 to ascertain whether the meeting object includes a link to a file hosted at the file hosting server 102. More specifically, the file hosting server 102 can assign unified resource locators (URLs) to files hosted at the file hosting server 102, wherein such URLs have features that are unique to the file hosting server 102, the enterprise 114, and the file. As will be described in greater detail below, when the file identifier component 124 determines that a meeting object includes a link to a file hosted at the file hosting server 102, the file identifier component 124 can cause data to be transmitted from the email server 104 to the file hosting server 102. This data can include, but is not limited to including, a title of the meeting, data that identifies the file referenced in the meeting object, electronic aliases of attendees identified in the meeting object, a time and date when the meeting represented by the meeting object is to begin, a time and date when the meeting represented by the meeting object is to end, an identity of an organizer of the meeting, and so forth.

The email server 104 further includes a data repository 126. The data repository 126 stores meeting objects 128 created by way of the scheduling application 120. The file identifier component 124, as noted above, can review the meeting objects 128 to ascertain whether one or more of the meeting objects 128 include a reference to a file hosted at the file hosting server 102. The data repository 126 may further include account information 130. The account information 130 may include identities of users in the enterprise 114 (e.g., as well as data that identifies their roles in the enterprise 114).

The file hosting server 102 includes a data repository 132 that stores hosted files 134 (e.g., files hosted by the file hosting server 102). The data repository 132 further stores the account info 130. In FIG. 1, the account info 130 is shown as being included on both the file hosting server 102 and the email server 104, such that each user in the enterprise 114 has a common identity across the file hosting server 102 and the email server 104. The file hosting server 102 further comprises a processor 136 and memory 138, where the memory 138 has a hosting application 140 loaded therein. The hosting application 140 is configured to provide functionality associated with a file hosting service, such as interfacing functionality, such that one or more of the client computing devices 106-110 can access hosted files at the file hosting server 102, invite others in the enterprise 114 (or outside the enterprise 114) to access one or more hosted files at the file hosting server 102, back up hosted files, and so forth. Further, for at least some file types, the hosting application 140 can provide tools for creating files of the file types and/or editing files of the file types. In a non-limiting example, the hosting application 140 can provide word processing functionalities, such that the client computing device 106, for example, can create and/or edit word processing files without having a specialized word processing application installed thereon. Instead, for instance, a browser can be executed at the client computing device 106, and the hosting application 140 can transmit data to the browser that allows the browser to act as a word processing application. Other exemplary file types for which the hosting application 140 can provide functionality that facilitates creating and/or editing files of the file types include spreadsheet file types, presentation file types, and so forth.

The hosting application 140 may have a hosted file 142 loaded therein. The hosted file 142 may be any suitable type of file, including a word processing file, a spreadsheet file, a presentation file, a video file, an audio file, etc. The hosting application 140 further includes a linker component 144 that is configured to link (correlate) a hosted file with a meeting object that includes a reference to the hosted file in response to receipt of the data generated by the file identifier component 124, as referenced above. More specifically, the linker component 144 can generate metadata and assign the metadata to the hosted file 142, wherein the metadata indicates that the hosted file has been referenced in a meeting object.

As will be described in greater detail below, once a hosted file is correlated with a meeting object, the hosting application 140 can be configured to cause notifications to be transmitted to at least one client computing device in the client computing devices 106-110 based upon such correlation. These notifications may be proactive notifications that, for instance, may remind a recipient of the notification to review the hosted file prior to the meeting. In another example, these proactive notifications may indicate that one or more attendees to the meeting have yet to review the hosted file. In still yet another example, a notification may indicate that a task remains open on the hosted file prior to the meeting.

For purpose of explanation, exemplary operation of computing devices in the system 100 is now set forth. The client computing device 110 may be operated by a first user, wherein the client computing device 110 is in communication with the email server 104. The first user operates the client computing device 110 to interact with the scheduling application 120 in a manner that causes the scheduling application 120 to generate the meeting object 122.

Figure 2:
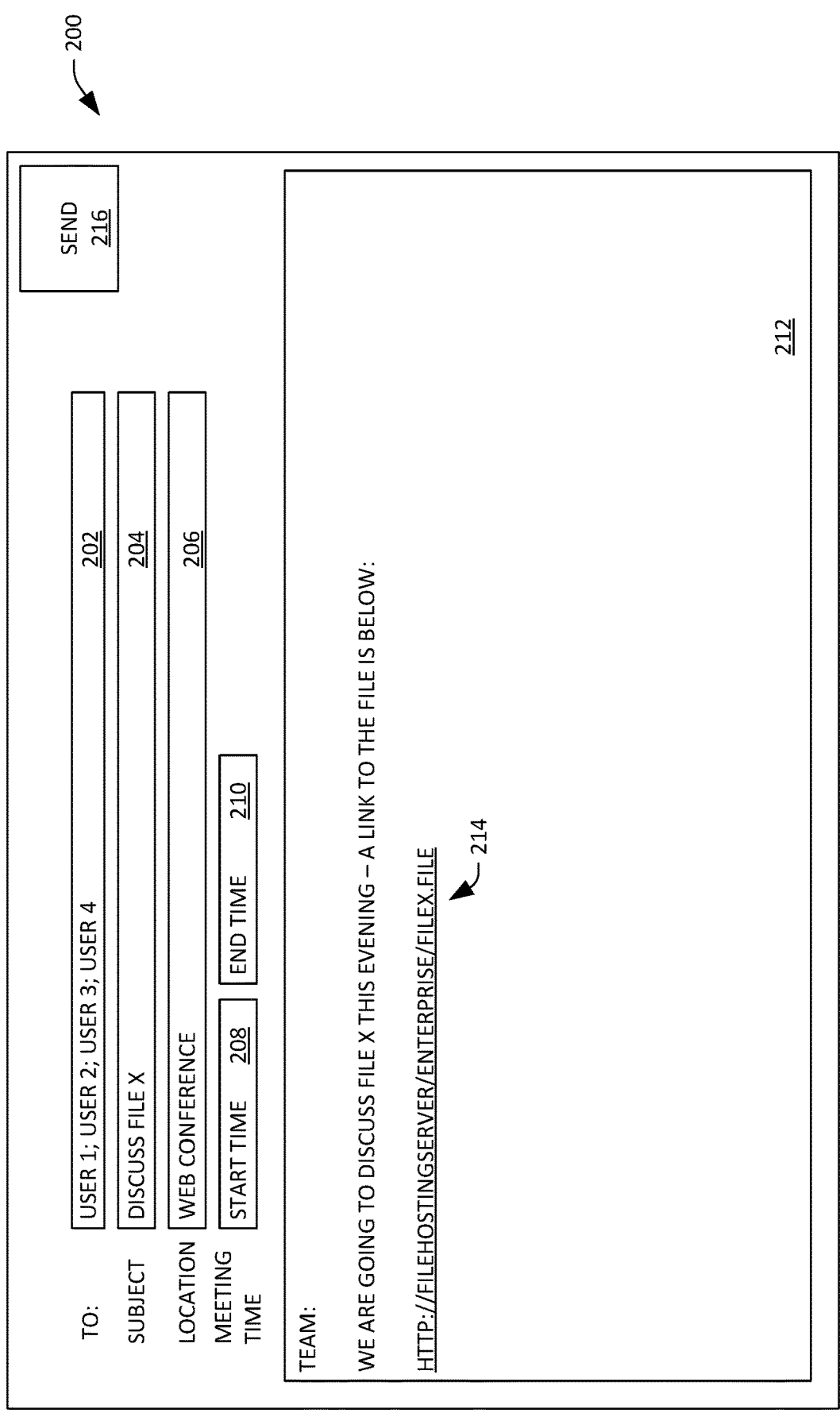
FIG. 2 illustrates an exemplary graphical user interface that facilitates generating a meeting object that includes a reference to a file hosted at a file hosting server.

Referring to FIG. 2, an exemplary graphical user interface 200 that can be presented on a display of the client computing device 110 is illustrated. The graphical user interface 200 facilitates creation of the meeting object 122. The graphical user interface 200 includes a field 202 that can be populated with electronic aliases of users who are to be invited to a meeting. For instance, the first user of the client computing device 110 can operate the client computing device 110 to populate the field 202 with electronic aliases of a plurality of users. These aliases can match aliases in the account information 130 retained at the email server 104 and/or the file hosting server 102. The graphical user interface 200 also includes a subject field 204, wherein the first user of the client computing device 110 can populate the subject field 204 with a subject of the meeting. The graphical user interface 200 also includes a location field 206, wherein the first user of the client computing device 110 can populate the location field 206 with a location of the meeting. In the example shown in FIG. 2, the location is identified as being a web conference.

The graphical user interface 200 also includes a start time field 208 and an end time field 210. The start time field 208 can be populated by the first user operating the client computing device 110 with a time and date when the meeting is to begin. Further, the first user of the client computing device 110 can populate the end time field 210 with a time and date when the meeting is to end.

The graphical user interface 200 also includes a content field 212, which can include additional content about the meeting. In this example, the user of the client computing device 110 has populated the content field 212 with a link 214. The link 214, in this example, is a link to the hosted file 142 at the file hosting server 102. In the example shown in FIG. 2, the link corresponds to a URL of the hosted file 142 at the file hosting server 102, wherein the URL 214 includes information unique to the file hosting server 102 and/or the enterprise 114. It is to be understood that the link 214 shown in the content field 212 of the graphical user interface 200 is an exemplary form in which a link can be presented in the content field 212. In another example, the link may be represented as an icon. In any event, however, the reference to the hosted file 142 in the content field 212 includes information that is indicative of the file hosting server 102, the enterprise 114, and/or the hosted file 142. The graphical user interface 200 further comprises a button 216 that, when selected by the first user operating the client computing device 110, causes the scheduling application 120 to transmit meeting invitations to client computing devices operated by users having the aliases set forth in the field 202, and further causes the scheduling application 120 to create the meeting object 122. As referenced above, the meeting object 122 can include, but is not limited to including, the electronic aliases set forth in the field 202, the subject set forth in the subject field 204, the location set forth in the location field 206, the time set forth in the start time field 208, the time set forth in the end time field 210, and the content set forth in the content field 212, including an identity of the hosted file 142 referenced in the content field 212.

Returning to FIG. 1, responsive to the scheduling application 120 creating the meeting object 122, the file identifier component 124 can analyze data in the content field 212 and can determine the content field 212 comprises a reference to a file hosted the file hosting server 102 (e.g., the hosted file 142). In response to determining that the meeting object 122 includes a reference to a file hosted at the file hosting server 102, the file identifier component 124 can cause the email server 104 to transmit data to the file hosting server 102. The data transmitted to the file hosting server 102 indicates that the meeting object 122 generated by the scheduling application 120 includes a reference to the hosted file 142. In a specific example, the data transmitted by the email server 104 to the file hosting server 102 may include electronic aliases in the field 202, the subject set forth in the subject field 204, the location set forth in the location field 206, the time set forth in the start time field 208, the time set forth in the end time field 210, and data that identifies the file referenced in the content field 212 (e.g., data that identifies the hosted file 142).

The hosting application 140, executed by the processor 136, receives the data generated by the file identifier component 124. For instance, the file identifier component 124 can cause the email server 104 to push the data to the file hosting server 102. In another example, the file hosting server 102 may periodically pull this data from the email server 104. In response to receiving the data generated by the scheduling application 120, the linker component 144 of the hosting application 140 assigns metadata to the hosted file 142. The metadata can include, or be based upon, the data generated by the scheduling application 120. For example, the metadata assigned to the hosted file 142 may include the electronic aliases in the field 202, the time set forth in the start time field 208, the time set forth in the end time field 210, and an identity of the meeting object 122. Thus, the linker component 144 correlates the meeting object 122 (which includes a reference to the hosted file 142) with the hosted file 142.

Once the linker component 144 has correlated the hosted file 142 with the meeting object 122, the hosting application 140 can perform a variety of tasks. As will be shown and described in detail below, the hosting application 140 can be configured to track activities undertaken with respect to the hosted file 142. For example, a user of the client computing device 106 may log onto the file hosting server 102 and access the hosted file 142. The hosting application 140 can track this access as a view of the hosted file 142 by the user of the client computing device 106, and can assign metadata to the hosted file 142 that indicates that at a certain time, the user of the client computing device 106 viewed the hosted file 142. Thereafter, the user of the client computing device 108 may access the hosted file 142 and edit the hosted file 142, thereby creating a new version of the hosted file 142. The hosting application 140 can assign metadata to the hosted file 142, wherein the metadata indicates that the user of the client computing device 108 accessed and edited the hosted file 142, as well as a time in which the edit occurred. The reference to the hosted file 142 in the meeting object 122 can also be identified as an activity undertaken with respect to the hosted file 142 by the hosting application 140.

The hosting application 140 may generate and/or update an activity feed for the hosted file 142 that includes a plurality of entries that are respectively represented of a plurality of activities undertaken with respect to the hosted file 142 by users in the enterprise 114. The entries can be arranged chronologically. Moreover, the hosting application 140 can generate the activity feed for the hosted file 142 such that it is specific to each user. For instance, a user of the client computing device 106 may be included as an attendee in the meeting object 122, while the user of the client computing device 108 may not be included as an attendee in the meeting object 122. Therefore, an activity feed for the hosted file 142 will include an entry for the meeting represented by the meeting object 122 when the hosted file 142 is accessed by the user of the client computing device 106. However, the activity feed for the hosted file 142 will not include an entry for the meeting represented by the meeting object 122 when the hosted file 142 is accessed by the user of the client computing device 108, as the user of the client computing device 108 was not included as an attendee in the meeting object 122.

As the hosting application 140 correlates the hosted file 142 with the meeting object 122, and further as the hosting application 140 tracks activities undertaken on the hosted file 142 over time, the hosting application 140 can be configured to cause notifications pertaining to the hosted file 142 and the meeting object 122 to be transmitted to client computing devices operated by users who are included as attendees in the meeting object 122. Exemplary notifications that can be caused to be transmitted to client computing devices by the hosting application 140 will be described below.

Figure 3:
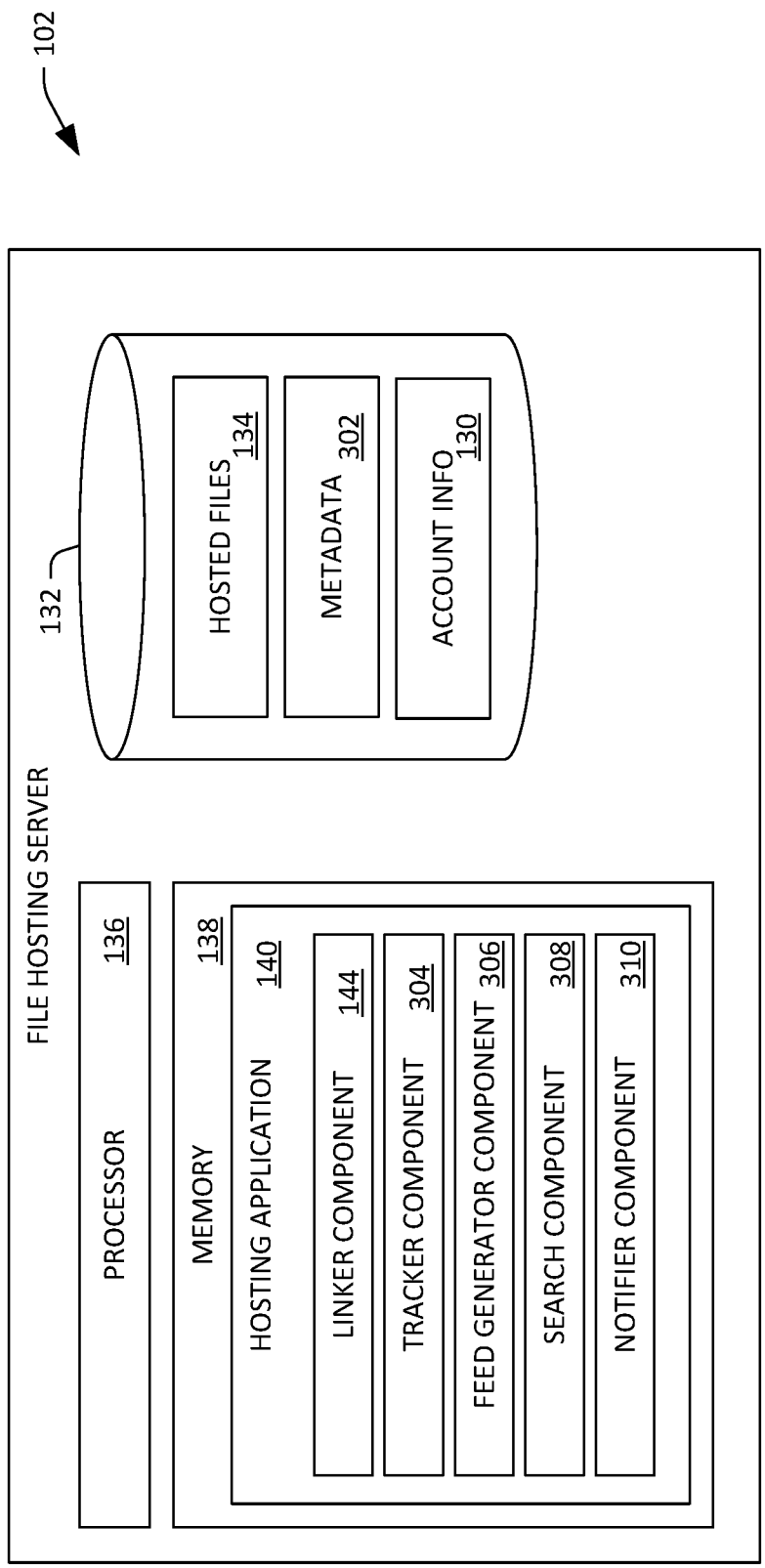
FIG. 3 is a functional block diagram of an exemplary file hosting server.

Now referring to FIG. 3, a functional block diagram of the file hosting server 102 is illustrated. The file hosting server 102 includes the processor 136 and the memory 138, wherein the memory 138 has the hosting application 140 loaded therein. The file hosting server 102 also includes the data repository 132 with the hosted files 134 and the account information 130 stored therein. As noted previously, the linker component 144, in response to receiving data generated by the scheduling application 120, assigns metadata to a hosted file, wherein the metadata correlates the hosted file with a meeting object that references the hosted file. Thus, the data repository 132 also includes metadata 302, which is stored in association with respective files in the hosted files 134.

The hosting application 140 further includes a tracker component 304 that is configured to track activities undertaken with respect to files in the hosted files 134 over time. The tracker component 304 assigns additional metadata to a hosted file when an activity is undertaken with respect to the hosted file. Exemplary activities that can be tracked by the tracker component 304 include a viewing of a hosted file, editing of a hosted file, communication of a hosted file (e.g., by way of email, instant message, etc.), and so forth.

The hosting application 140 also includes a feed generator component 306 that is configured to construct activity feeds for hosted files based upon the metadata assigned to the hosted files. An activity feed, as mentioned above, includes a time-ordered sequence of entries that are representative of activities undertaken with respect to the file. An entry in an activity feed for a hosted file can include an identity of the activity undertaken with respect to the file, a time when the activity was performed (or, in the case of an entry representative of a meeting object, a time when the meeting will occur or has occurred), and an identity of a user or identities of users who performed the activity. In another example, the feed generator component 306 can generate an activity feed for an individual user. In such case, the activity feed can indicate activities undertaken with respect to several files, over time, by the user. Additionally, the feed generator component 306 can generate an activity feed for a folder, wherein the activity feed includes entries representative of activities undertaken with respect to files in the folder. In yet another example, the feed generator component 306 can generate an activity feed for a group of people (e.g., a team in an organization), wherein entries in the activity feed are representative of activities undertaken with respect to a plurality of files by members of the team.

The hosting application 140 may further include a search component 308 that is configured to execute a search over metadata corresponding to at least one file in the hosted files 134. In an example, the search component 308 can receive a query which is representative of a desire to locate files that are referenced in meeting objects. The search component 308 can identify such files based upon content of the metadata 302 and can output search results that include files that have been referenced in meeting objects.

The hosting application 140 may also comprise a notifier component 310 that is configured to cause notifications to be transmitted to client computing devices based upon a hosted file being correlated with a meeting object. In a non-limiting example, based upon metadata assigned to a hosted file, the notifier component 310 can determine that the hosted file is referenced in a meeting object that is representative of a meeting that is to occur at some point in time in the future. At a threshold time prior to the time when the meeting is to begin, the notifier component 310 can cause a notification to be transmitted to at least one client computing device based upon the hosted file being referenced in the meeting object.

In a first example, at the threshold time prior to the time when the meeting is to begin, the notifier component 310 can determine that a user included as an attendee in the meeting object has failed to review the hosted file (and, therefore, may be unprepared for the meeting). The notifier component 310 can cause a notification to be transmitted to a client computing device operated by the user based upon such determination, wherein the notification includes a reminder to the user to review the file. In another example, at the threshold time prior to the meeting, the notifier component 310 can determine that another user, who is included as an attendee in the meeting object, has failed to review the hosted file. In response to making the determination, the notifier component 310 can transmit a notification to the client computing device operated by the user (e.g., who may be the organizer of the meeting), wherein the notification indicates that the another user has failed to review the file prior to the meeting. This notification may also include a link that, when selected by the user, can cause the meeting object to be presented to the user, such that the user can modify the meeting (e.g., delay the meeting to provide attendees thereof more time to review the hosted file).

In still yet another example, the hosted file 142 may have a task assigned thereto. Exemplary tasks that may be assigned to a hosted file include: 1) a feedback task, where a user is to provide feedback; 2) an approval task, where a user is to approve the file; 3) a task for a user to modify a certain portion of the file, etc. At the threshold time prior to the meeting, the notifier component 310 can ascertain that there is an open task with respect to the file 142. Based upon such determination, the notifier component 310 can transmit at least one notification to users identified as attendees in the meeting object to inform such users that the hosted file 142 has an open task corresponding thereto. Further, the notifier component 310 can cause a notification to be transmitted to a computing device operated by a user to whom the task is assigned, even if the user is not included in the meeting object 122. This notification can remind the user of the task to complete the task prior to the meeting.

Figure 4:
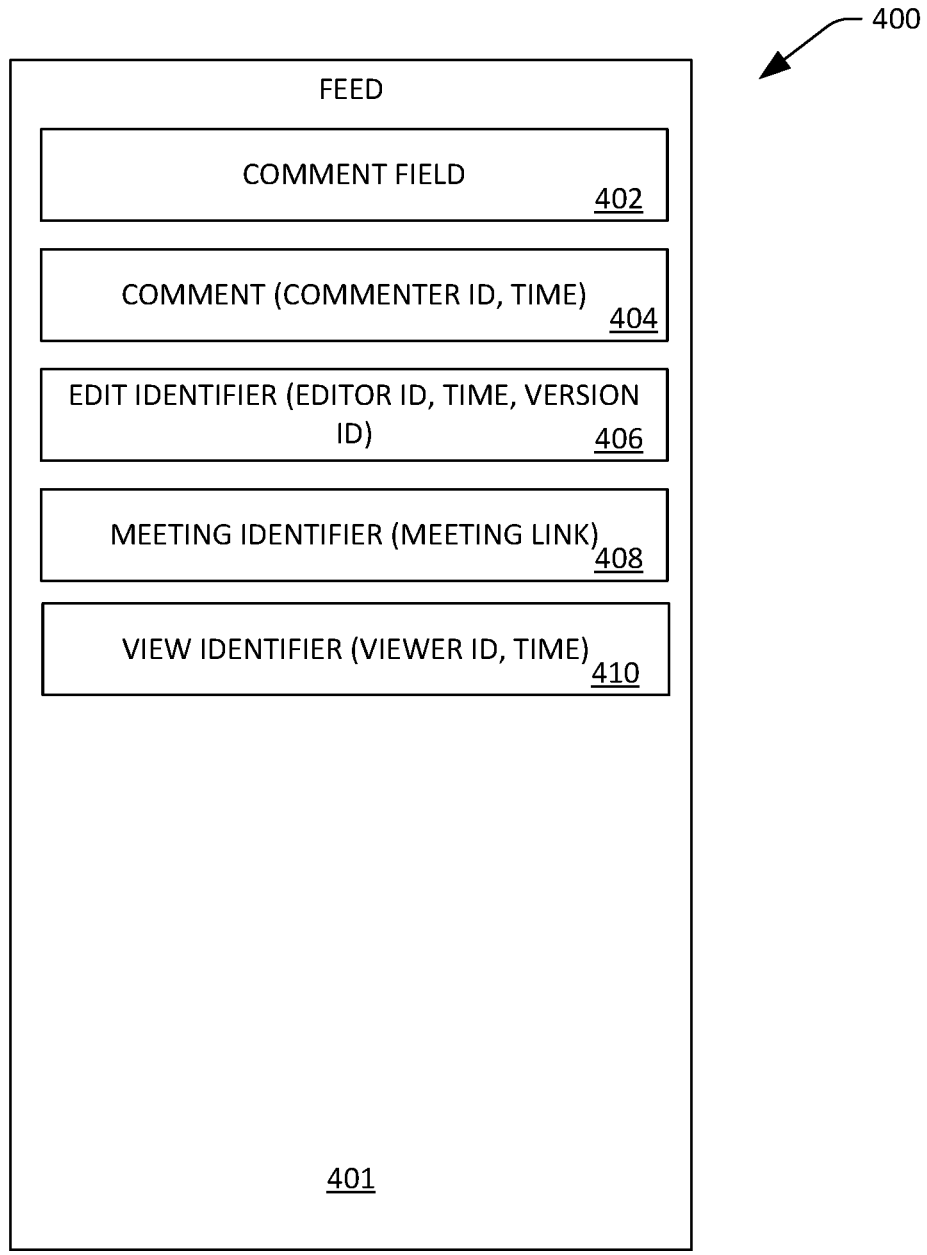
FIG. 4 illustrates an exemplary activity feed for a file hosted at a file hosting server.

Now referring to FIG. 4, an exemplary graphical user interface 400 of an activity feed 401 that can be generated by the feed generator component 306 is illustrated. The activity feed 401 includes a comment field 402, which is a text entry field where a viewer of the hosted file 142, for example, can set forth a comment about the hosted file 142. Thus, the feed generator component 306 can update the activity feed 401 with a comment entered by way of the comment field 402. The activity feed 401 depicted in FIG. 4 includes four entries 404-410. The entry 404 is representative of a commenting activity, where a user has set forth a comment about the hosted file 142 by way of the hosting application 140 (e.g., by way of the comment field 402 in the activity feed 401). The entry 404 may include at least a portion of the comment, data that identifies the user who made the comment, and time that the comment was made by such user.

The second entry 406 indicates that an edit has been made to the hosted file 142. The entry 406 can include an edit identifier (indicating that the activity was an edit), contents of the edit, a location in the hosted file 142 where the edit was made, etc. Further, the entry 406 may include an identity of the editor, a time that the edit was made, and an indication that the edit corresponds to an updated version of the hosted file 142. Thus, a reviewer of the activity feed 401 may be able to quickly ascertain that entries above the entry 406 in the activity feed 401 correspond to a different version of the hosted file 142 than entries below the entry 406 in the activity feed 401.

The entry 408 indicates that the hosted file 142 was referenced in a meeting object, and that the meeting represented by the meeting object took place after the edit to the hosted file 142 (represented by the entry 406) was made to the hosted file 142. In a non-limiting example, the entry 408 may include a link to the meeting object that, when selected, causes the meeting object to be graphically presented.

The entry 410 indicates that a user viewed the hosted file 142 (e.g., after the meeting). The entry 410 can include data that indicates that the activity was a viewing of the hosted file 142, as well as an identity of the user who viewed the file 142 and a time that the file 142 was viewed. The activity feed 401 for the hosted file 142 thereby allows a viewer of the activity feed 401 to understand the context of the hosted file 142 around the meeting where the hosted file 142 was referenced.

Figure 5:
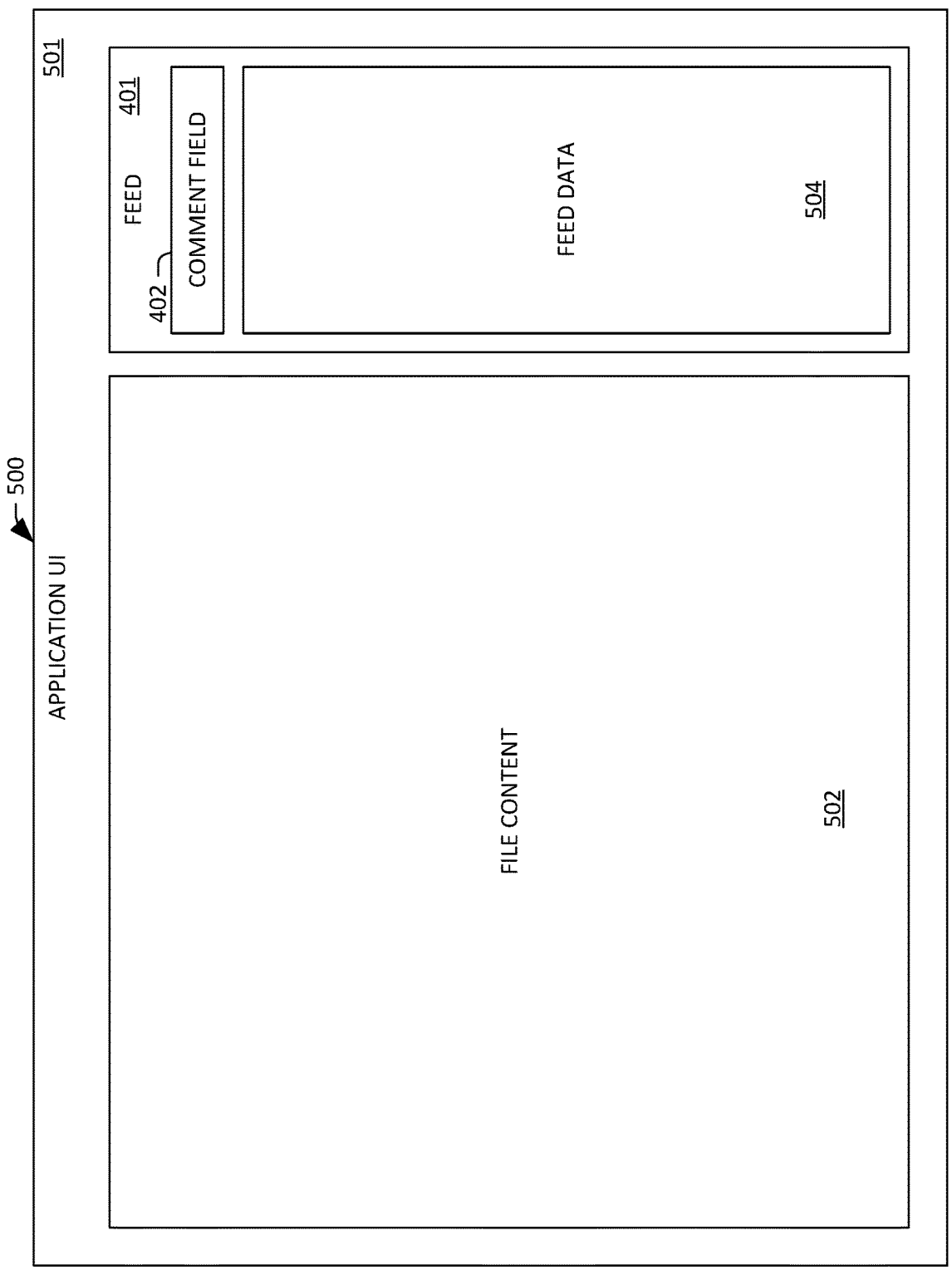
FIG. 5 depicts an exemplary graphical user interface that includes an activity feed shown together with content of a file hosted at a file hosting server.

With reference now to FIG. 5, an exemplary graphical user interface 500 that depicts the activity feed 401 is illustrated. The graphical user interface 500 includes an application user interface 501, wherein the application user interface 501 is a graphical user interface for an application that is utilized to present and/or edit content of the hosted file 142. For instance, the application user interface 501 may be a user interface for a web browser that is configured to perform word processing functionality. In another example, the application user interface 501 may be a user interface for a client application that can synchronize with the hosting application 140. Exemplary client applications include a word processing application, a spreadsheet application, a presentation application, and the like.

The application user interface 501 includes a field 502 where content of the hosted file 142 can be presented. The application user interface 501 may also include the activity feed 401, which comprises the comment field 402 and feed data 504. The feed data 504 includes a plurality of time-ordered entries, such as the entries 402-410 shown in FIG. 4. Therefore, when a user is viewing content of the hosted file 142 in the application user interface 501, the activity feed 401 can also be presented and the feed data 504 can include an indication that the hosted file 142 is referenced in a meeting object generated by way of the scheduling application 120.

Figure 6:
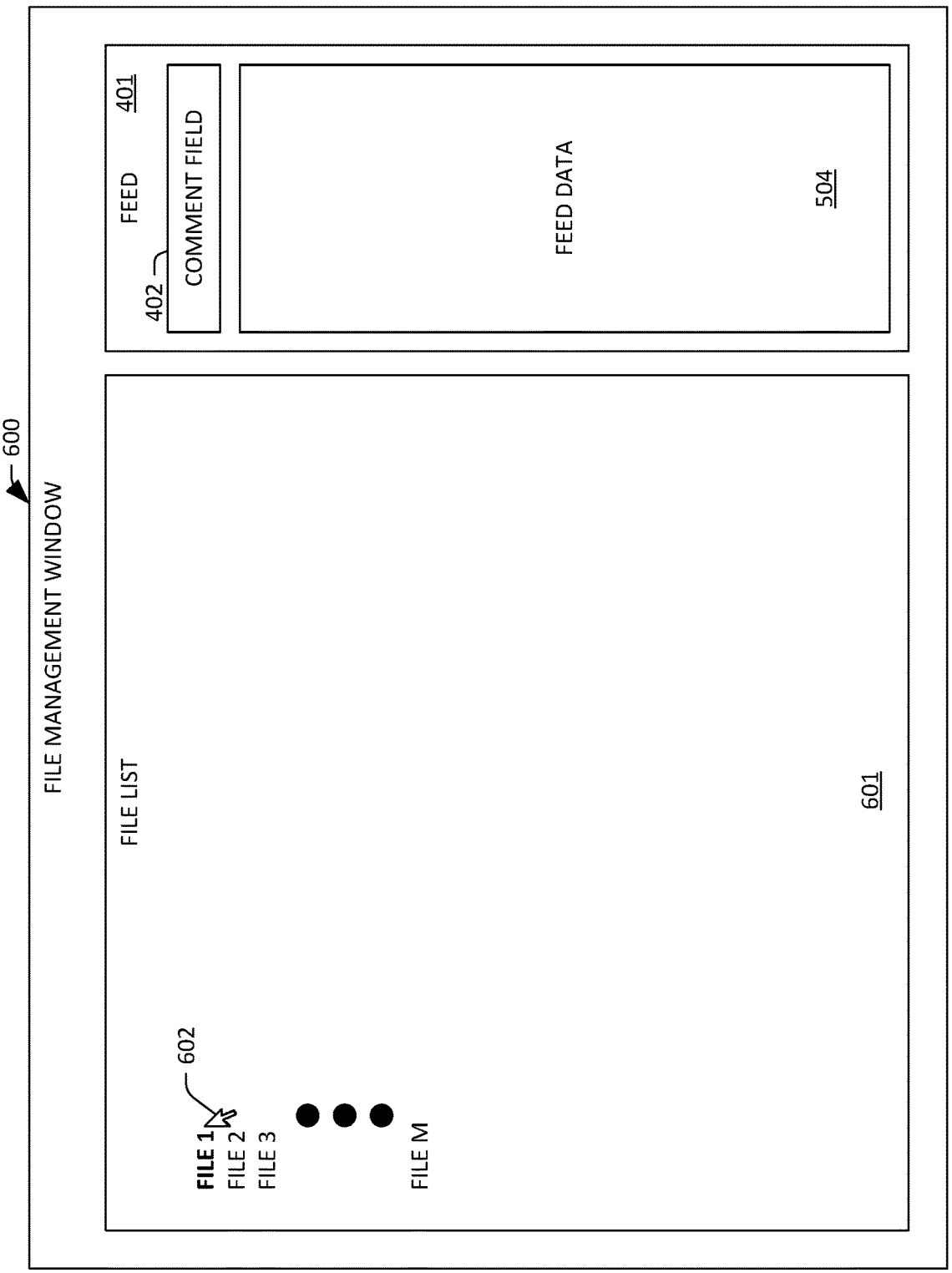
FIG. 6 depicts an exemplary graphical user interface that includes a field where an activity feed is shown.

Now referring to FIG. 6, an exemplary graphical user interface 600 corresponding to a file management window provided by the hosting application 140 is illustrated. The graphical user interface 600 includes a field 601 that depicts a list of files. More particularly, a user of one of the client computing devices 106-110 may log into the file hosting application 140 and may be provided with a list of files that can be viewed and/or edited by the user. Utilizing a cursor 602, for instance, the user of the client computing device can select one of the files (e.g., FILE 1). Responsive to the file being selected, the activity feed 401 for the file can be presented in the graphical user interface 600. The activity feed 401 includes the comment field 402 and the feed data 504. Thus, in the graphical user interface 600, the user need not open the hosted file 142 to be provided with the activity feed 401 for the hosted file 142.

Figure 7:
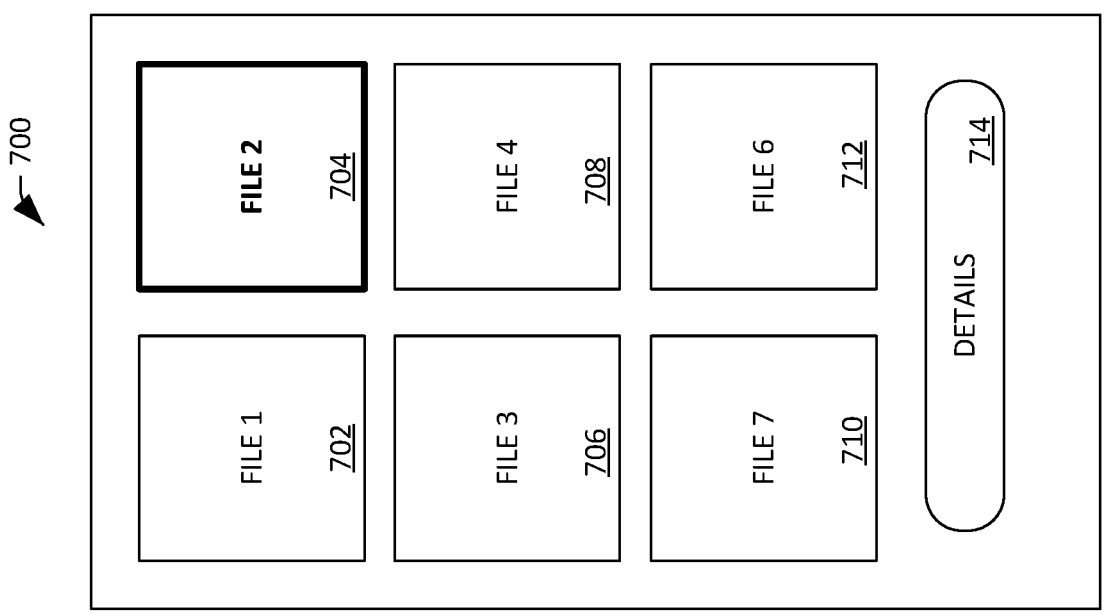
FIG. 7 illustrates an exemplary graphical user interface that is well-suited for presentment on a mobile telephone.

Turning now to FIG. 7, an exemplary graphical user interface 700 is illustrated, wherein the graphical user interface 700 can be presented on the display of a client computing device when the client computing device is a mobile computing device. The graphical user interface 700 can include a plurality of icons 702-712 that are respectively representative of files hosted by the file hosting application 140 that are accessible to a user of the client computing device. When the user selects one of the icons (e.g., icon 704), a button 714 can be presented on the graphical user interface 700, wherein selection of the button 714 causes the activity feed 401 to be presented on the display of the client computing device. As the display of a mobile client computing device may be relatively small, the activity feed 401 may be displayed over the plurality of icons 702-712, thereby temporarily hiding such icons 702-712 from view.

Figure 8:
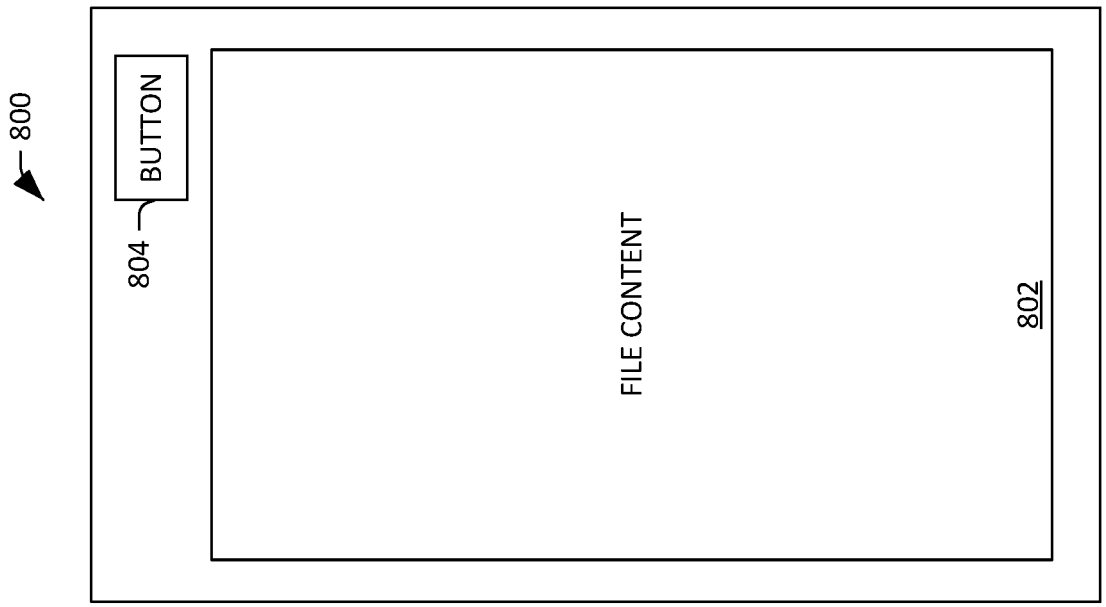
FIG. 8 depicts another graphical user interface that is well-suited for presentment on a mobile telephone.

Turning now to FIG. 8, another exemplary graphical user interface 800 that can be presented by display of a client computing device when the client computing device is a mobile computing device is illustrated. The graphical user interface 800 includes a content field 802 that depicts content of the hosted file 142 when presented on the display of the client computing device. The graphical user interface 800 also includes a button 804 that, when selected, causes the activity feed 401 for the hosted file 142 to be shown on the display of the client computing device (e.g., over the content field 802).

Figure 9:
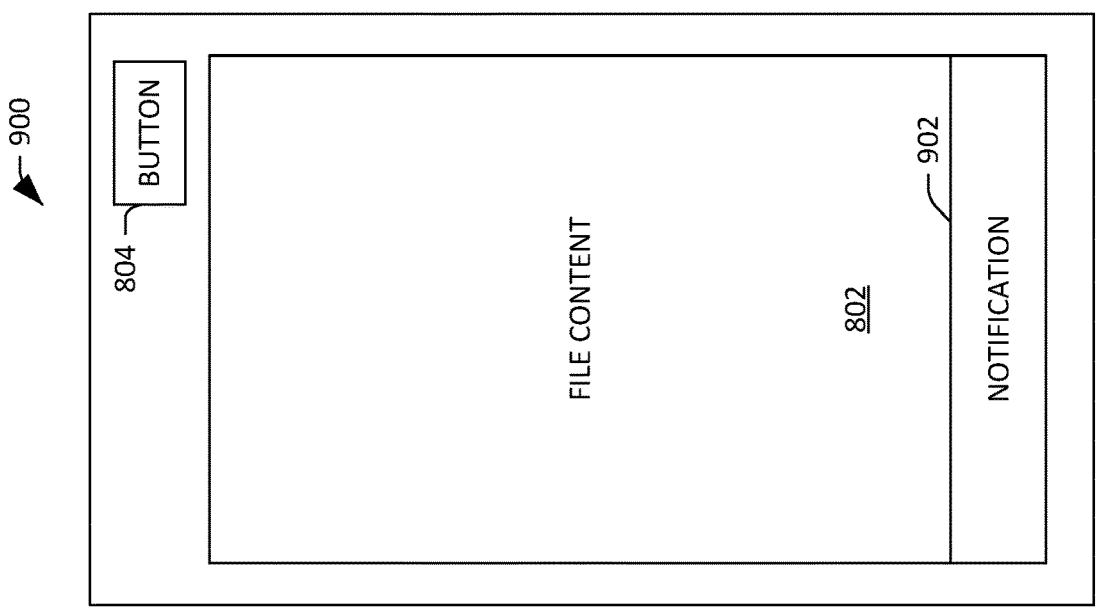
FIG. 9 depictions yet another graphical user interface that is well-suited for presentment on a mobile telephone.

With reference now to FIG. 9, yet another graphical user interface 900 that can be presented on a display of a client computing device when the display is a relatively small display is illustrated. The graphical user interface 900 is similar to the graphical user interface 800 shown in FIG. 8. In the exemplary graphical user interface 900, however, a notification 902 is presented. The notification 902 can indicate that a new activity has been undertaken with respect to the hosted file 142 (e.g., an activity not before seen by the viewer of the hosted file 142). In another example, the notification 902 may be a proactive notification pertaining to a meeting that references the hosted file 142. For example, the notification 902 can indicate that another attendee of the meeting has failed to review the hosted file 142. In another example, the notification 902 can indicate that an open task remains for the hosted file 142.

When the notification 902 is selected, several actions are contemplated. In a first example, the activity feed 401 for the hosted file 142 can be presented. In a second example, selection of the notification 902 can cause the meeting object that includes a reference to the hosted file 142 to be shown on the display, such that the user of the client computing device can modify the meeting object (e.g., change the time of the meeting object, altar attendees in the meeting object, etc.).

Figure 10:
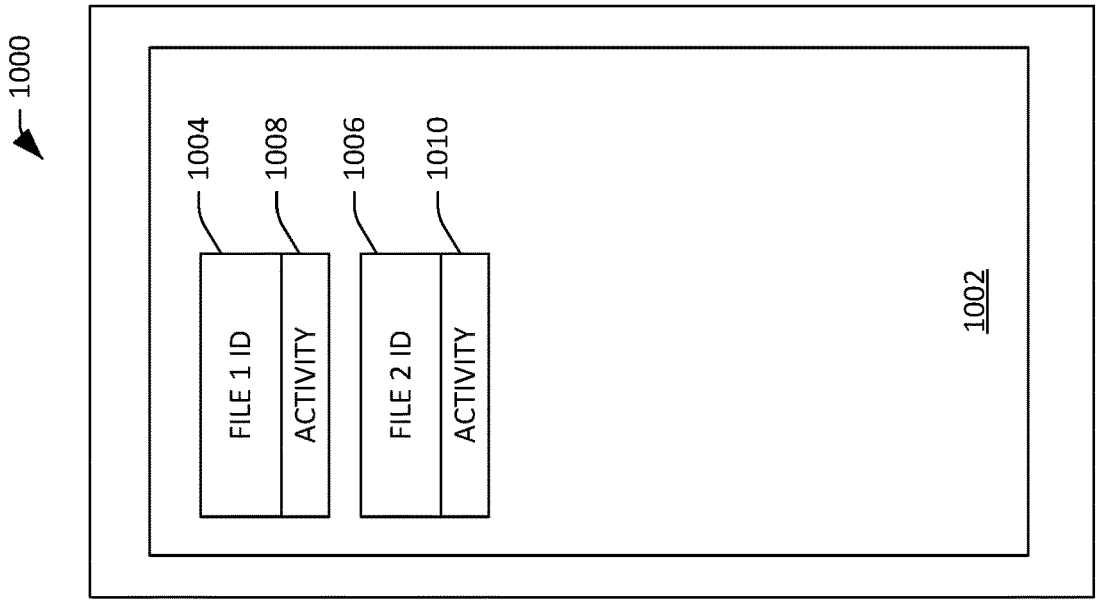
FIG. 10 depicts still yet another exemplary graphical user interface that is well-suited for presentment on a mobile telephone.

Referring now to FIG. 10, another exemplary graphical user interface 1000 is illustrated, wherein the graphical user interface 1000 is well-suited for display on a mobile computing device. The graphical user interface 1000 includes a field 1002 that comprises a list of file identifiers 1004-1006 that respectively represent files hosted by the file hosting application 140 (where such files are accessible to users of the client computing devices 106-110). Additionally, the identifiers 1004 and 1006 can have graphical data associated therewith that indicates that activity feeds for the files represented by the identifiers have "new" entries. For example, the graphical user interface 1000 can include an activity badge 1008 corresponding to the file identifier 1004, and can also include an activity badge 1010 corresponding to the file identifier 1006. In an example, the activity badge 1008 can indicate that the activity feed for the file represented by the file identifier 1004 has at least one new entry therein (e.g., an entry not before viewed by the user). Further, the activity badge 1008 can identify a number of new entries in the activity feed.

In another exemplary embodiment, rather than the activity identifiers 1008 and 1010 being shown in correlation with the file identifiers 1004 and 1006, notifications can be shown in correlation with such file identifiers 1004 and 1006. Thus, a reviewer of the file identifiers 1004 and 1006 can quickly ascertain that notifications pertaining thereto are available, wherein selection of the notification identifiers 1008 and 1010 can cause the respective notifications to be presented on the display.

Figure 11:
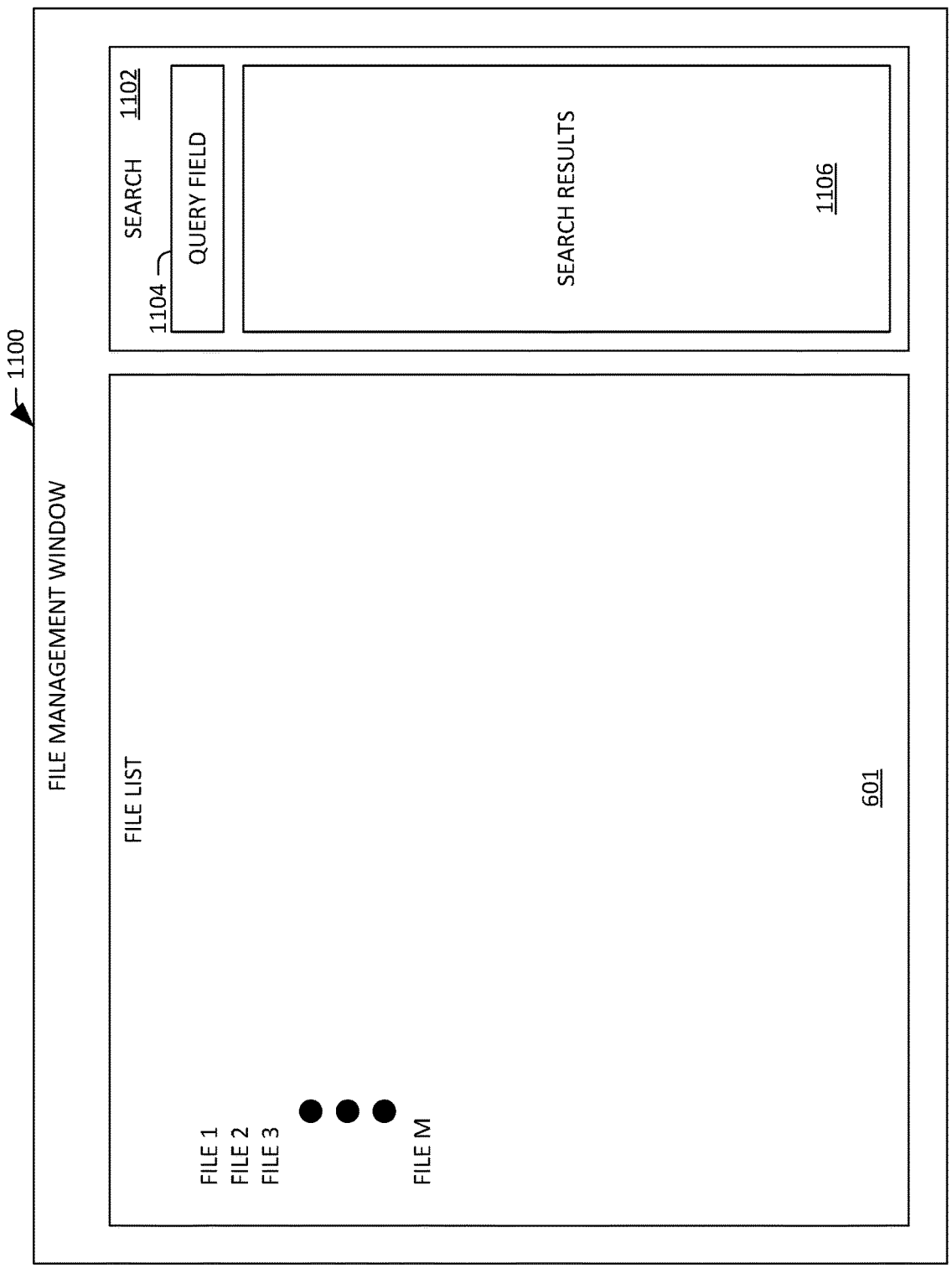
FIG. 11 illustrates an exemplary graphical user interface that is well-suited for presenting search results about files hosted at a file hosting server.

Referring now to FIG. 11, an exemplary graphical user interface 1100 that facilitates executing a search over the metadata 302 assigned to the hosted files 134 is illustrated. In the exemplary graphical user interface 1100, the field 601 depicts a list of files that are accessible (e.g., viewable and/or editable) to a user in the enterprise 114. The graphical user interface 1100 further includes a search field 1102, wherein the search field 1102 includes a query field 1104. A user may enter text into the query field 1104 that pertains to meetings. For instance, the user may enter a natural language query into the query field 1104, such as the query "show me files that are to be discussed in meetings in the next two weeks." A search can be conducted over the metadata 302, and files that are to be discussed in meetings (scheduled within the next two weeks) where the user is an attendee can be presented in a search results field 1106. In another example, the query field 1104 can be a drop-down menu that includes a plurality of selectable filter options. For instance, a filter option may be to filter files available to the user based upon whether or not such files are correlated with meeting objects. Additional filters may also be available by way of the query field 1104, such as a filter by time, document type, meeting attendee, etc. The search results field 1106 may be populated with one or more files that meet the filter criteria set forth in the query field 1104.

Figure 12:
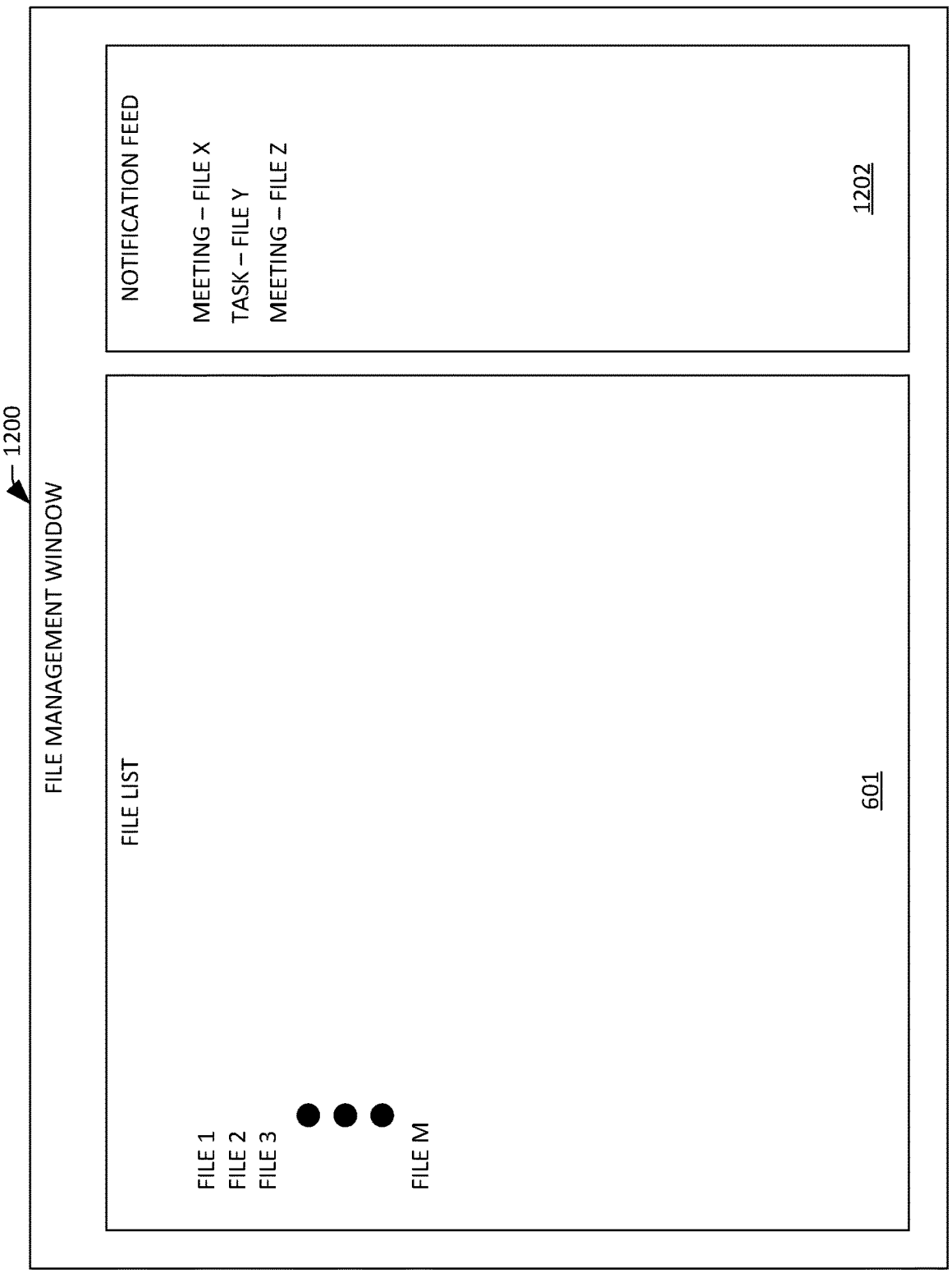
FIG. 12 depicts an exemplary graphical user interface that includes a notification feed for a user who is logged into a file hosting application.

Turning now to FIG. 12, an exemplary graphical user interface 1200 that can be presented to a user in the enterprise 114 when the user logs into the file hosting application 140 is illustrated. The graphical user interface 1200 includes the field 601 that depicts several files that are accessible to the user. The graphical user interface 1200 further includes a notification feed 1202 that includes a plurality of time-ordered entries that correspond to notifications about files accessible to the user. As shown in the graphical user interface 1200, the notification feed 1202 can include notifications that indicate that certain files, accessible to the user, are to be discussed in meetings where the user is an attendee. Further, the notification feed 1202 may include a notification that indicates that the user is to perform a task with respect to a file (FILE Y) prior to a meeting where the file is to be discussed.

FIGS. 13-16 illustrate exemplary methodologies relating to correlating a file hosted by a file hosting server with a meeting object. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 13:
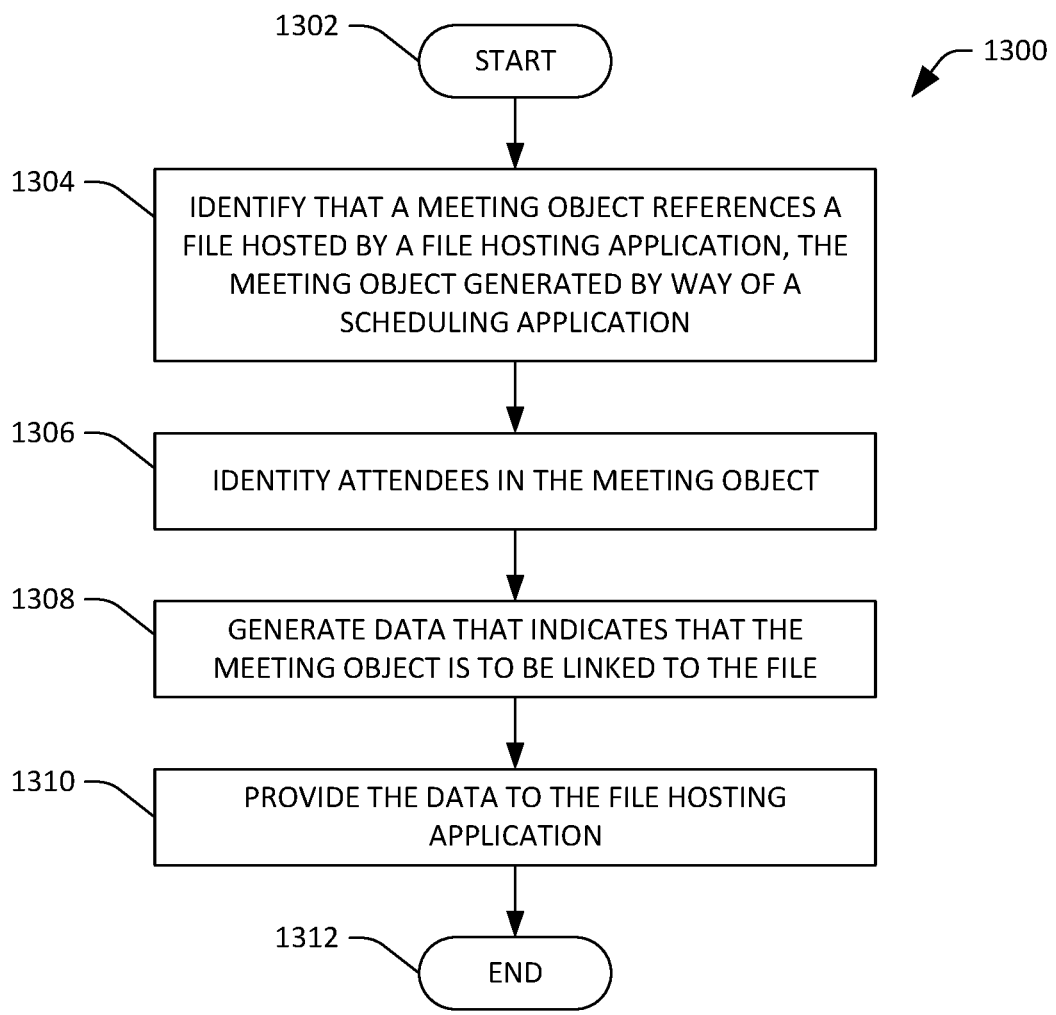
FIG. 13 is a flow diagram that illustrates an exemplary methodology that facilitates provision of data to a file hosting application that allows the file hosting application to correlate a file hosted at a file hosting server with a meeting object created by a scheduling application.

Now referring solely to FIG. 13, an exemplary methodology 1300 that facilitates correlating a file hosted by a file sharing application with a meeting object generated by a scheduling application is illustrated. The methodology 1300 is executed by a server that hosts a scheduling application. The methodology 1300 starts at 1302, and at 1304 it is identified that a meeting object references a file hosted by a file hosting application. As indicated previously, the meeting object is generated by way of a scheduling application (which can be, or be included in, an email application and/or a calendaring application). The meeting object can be identified as including a reference to a file hosted by the file hosting application based upon a URL assigned to the file, where the URL may be specific to the file hosting application, as well as a certain enterprise.

At 1306, attendees in the meeting object are identified. At 1308, data is generated that indicates that the meeting object is to be linked to the file hosted by the file sharing application. At 1310, the data is provided to the file hosting application (e.g., transmitted from the server to the file hosting server). The methodology 1300 completes at 1312.

Figure 14:
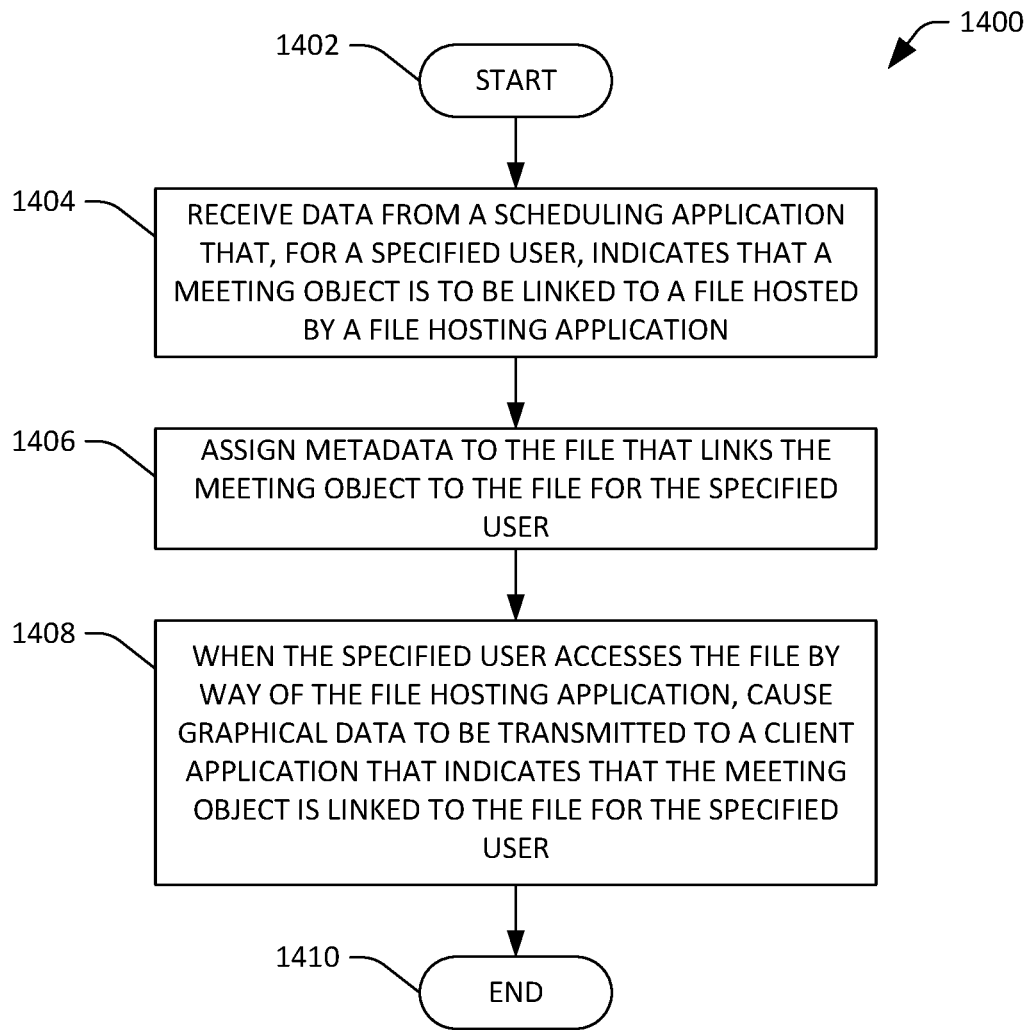
FIG. 14 is flow diagram illustrates an exemplary methodology for graphically indicating to a user that a file, hosted at a file hosting server, is referenced in a meeting object.

Referring to FIG. 14, an exemplary methodology 1400 that facilitates informing a user that a file hosted by a file hosting application is correlated with a meeting object generated by a scheduling application is illustrated. The methodology 1400 starts at 1402, and at 1404 data is received from a server executing a scheduling application that, for specified user, indicates that a meeting object is to be linked (correlated) to a file hosted by a file hosting application. The data received from the server can include data that identifies the meeting object (e.g., a subject indicated in the meeting object), attendees in the meeting object (including the organizer), a time when a meeting represented by the meeting object is to begin, a time when the meeting represented by the meeting object is to end, and an identity of a file referenced in the meeting object.

At 1406, metadata is assigned to the file that links the meeting object to the file for a specified user. To be clear, the specified user is an attendee in the meeting object. For other users who are not attendees, there will be no link between the file and the meeting object.

At 1408, when the specified user accesses the file by way of the file hosting application, graphical data is caused to be transmitted to a client computing device that indicates that the meeting object is linked to the file for the specified user. This indication may be an entry in an activity feed for the file and the user, as described above. The methodology 1400 completes at 1410.

Figure 15:
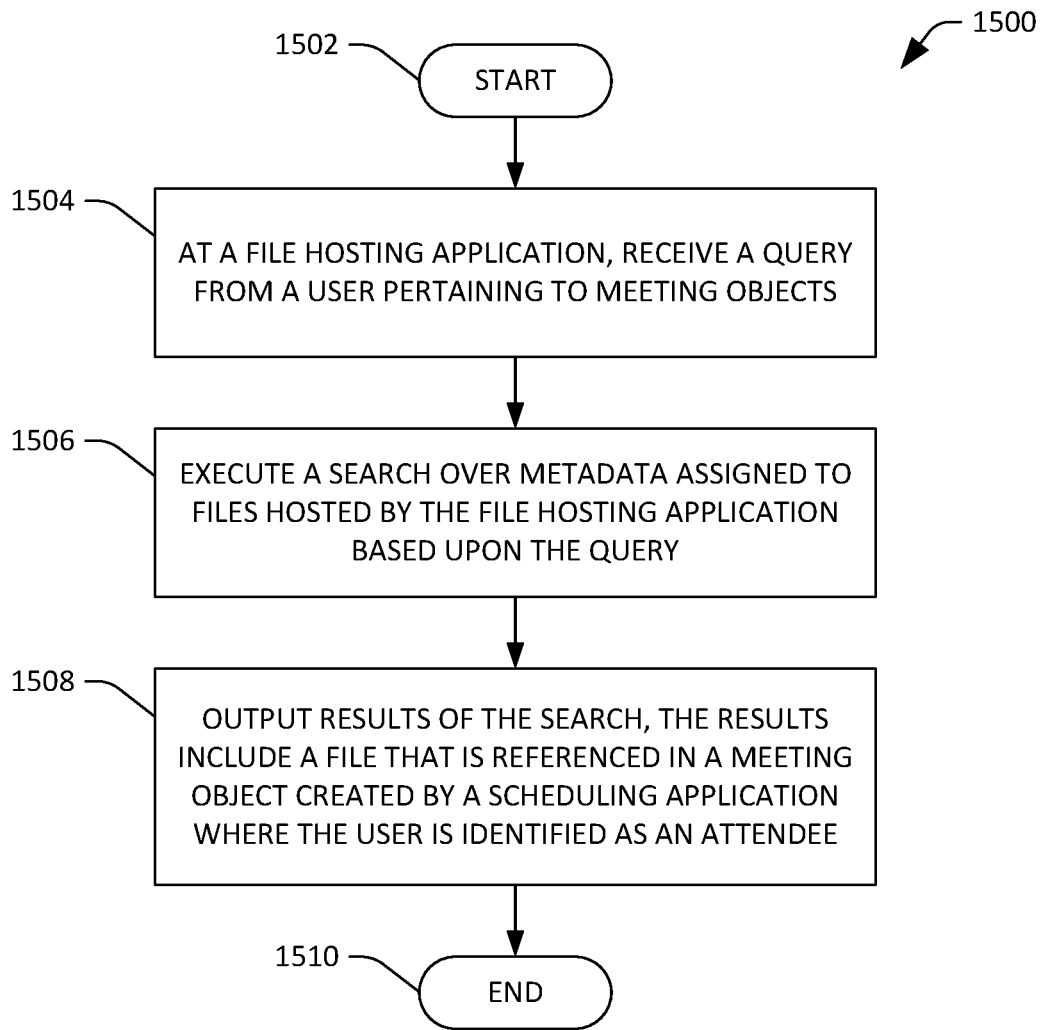
FIG. 15 is a flow diagram that illustrates an exemplary methodology for outputting search results pertaining to meeting objects.

With reference now to FIG. 15, an exemplary methodology 1500 that facilitates outputting search results based upon a file hosted by a file hosting application being correlated with meeting object generated by a scheduling application is illustrated. The methodology 1500 starts at 1502, and at 1504, at a file hosting application, a query from a user is received pertaining to meeting objects. As described previously, this query may be a natural language query or may be generated based upon selection of filter criteria (e.g., filter by meeting object). At 1506, a search over metadata assigned to files hosted by the file hosting application is executed based upon the query. Thus, metadata is searched over for information about meeting objects included in the metadata. At 1508, results of the search are output, wherein the results include a file that is referenced in a meeting object created by a scheduling application, where the user who submitted the query is identified as an attendee in the meeting object. The methodology 1500 completes at 1510.

Figure 16:
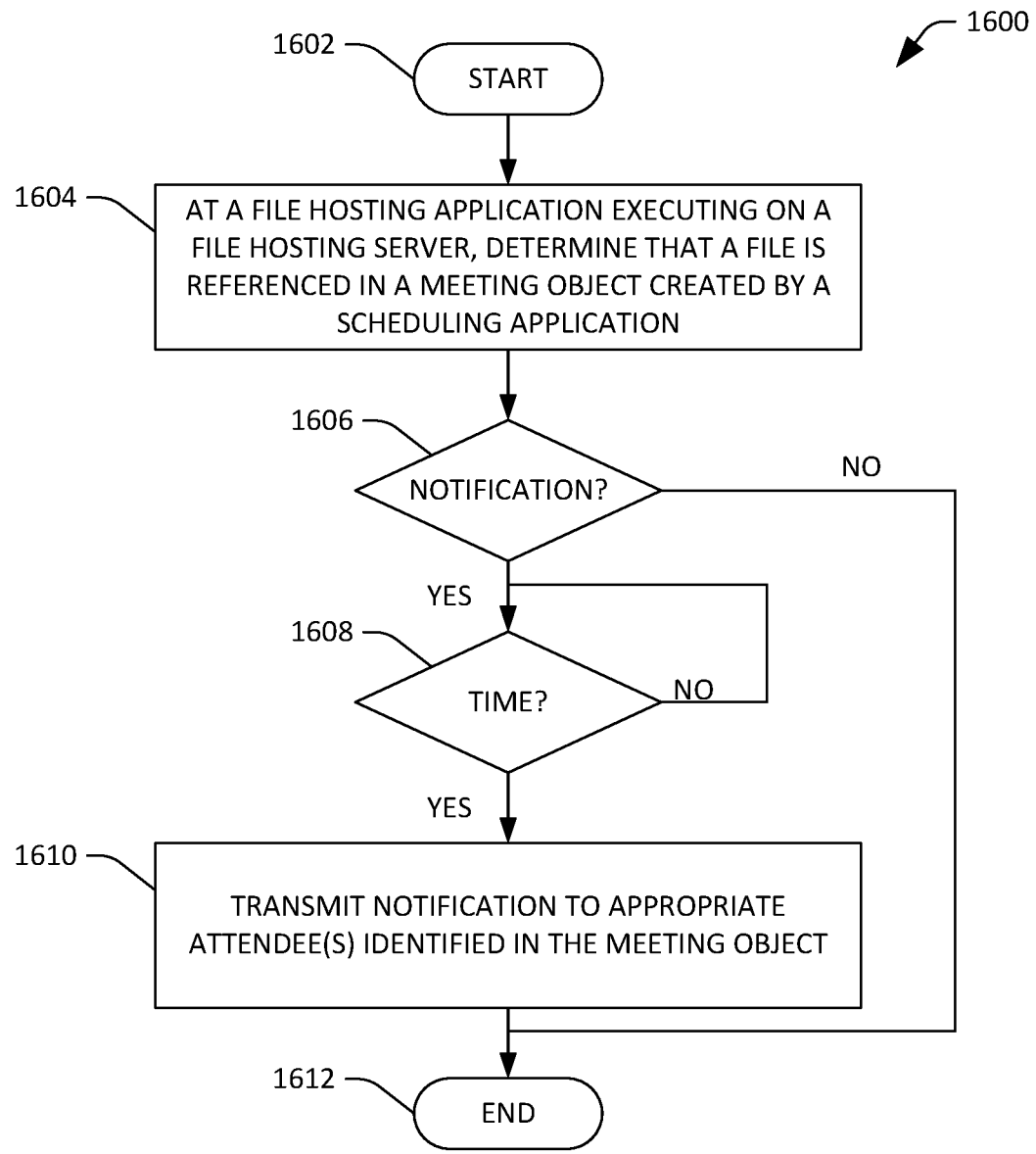
FIG. 16 is a flow diagram that illustrates an exemplary methodology for causing a notification to be transmitted to appropriate attendees identified in a meeting object based upon a file hosted at a file hosting server being correlated with the meeting object.

Turning now to FIG. 16, an exemplary methodology 1600 for transmitting a notification to a client computing device based upon a file hosted by a file hosting application being correlated with a meeting object generated by a scheduling application is illustrated. The methodology 1600 starts at 1602, and at 1604, at a file hosting application executing on a file hosting server, a determination is made that a file is referenced in a meeting object created by a scheduling application. In other words, metadata is assigned to the file that indicates that the file was referenced in a meeting object.

At 1606, a determination is made regarding whether there are any notifications to be transmitted for the file. If there are no notifications, then the methodology 1600 ends. If, however, the file is subject to notifications (e.g., it is desirable to provide attendees of the meeting with reminders for reviewing the file, reminders for completing tasks for the file, etc.), then the methodology proceeds to 1608, where a determination is made regarding whether it is an appropriate time for transmitting a notification. For instance, the user may specify that she wants to be notified some threshold amount of time prior to the occurrence of the meeting with respect to a reminder about reviewing the file. If the threshold time has not been met, then the methodology returns to 1608. At 1610, notifications transmitted to appropriate attendees identified in the meeting object. Again, these notifications can be reminders to review the file, indications that other attendees have not yet reviewed the file, an indication that one or more tasks remain open on the file, and so forth. The methodology 1600 completes at 1612.

Various examples are described herein.

Example 1

A computing system comprising: at least one processor; and memory that has a file hosting application loaded therein, wherein the at least one processor, when executing the file hosting application, is configured to perform acts comprising: receiving data generated by a scheduling application, the data indicates that a file hosted by the file hosting application is referenced in a meeting object generated by the scheduling application, the data comprises: identities of users referenced in the meeting object, an identity of the file hosted by the file hosting application referenced in the meeting object; and a time when a meeting represented by the meeting object is to occur; responsive to receiving the data, assigning metadata to the file hosted by the file hosting application, the metadata comprises the data generated by the scheduling application; and at a threshold time prior to the time when the meeting represented by the meeting object is to occur, causing a notification to be transmitted to a client computing device from which credentials of a user in the users have been received, the notification transmitted based upon the metadata assigned to the file.

Example 2

The computing system according to Example 1, the acts further comprising: responsive to assigning the metadata to the file hosted by the file hosting application, updating an activity feed for the file, the activity feed comprises a plurality of entries that are representative of a plurality of activities undertaken with respect to the file, wherein updating the activity feed comprises adding an entry in the activity feed, the entry indicates that the file is referenced in the meeting object.

Example 3

The computing system according to Example 2, the entry comprises a link to the meeting object, the acts further comprising: responsive to detecting selection of the link, transmitting selection data to the scheduling application, wherein the scheduling application, responsive to receiving the selection data, causes the meeting object to be presented on a display of the client computing device.

Example 4

The computing system according to any of Examples 2 or 3, wherein the plurality of entries in the activity feed are arranged chronologically, and wherein the entry is placed in the activity feed based upon the time when the meeting represented by the meeting object is to occur.

Example 5

The computing system according to any of Examples 1-4, the acts further comprising: at the threshold time prior to the time when the meeting represented by the meeting object is to occur, determining that the user has failed to open the file hosted by the file hosting application; and causing the notification to be transmitted responsive to determining that the user has failed to open the file, the notification comprising a reminder to the user to review the file.

Example 6

The computing system according to any of Examples 1-5, the acts further comprising: at the threshold time prior to the time when the meeting represented by the meeting object is to occur, determining that another user in the users has failed to open the file hosted by the file hosting application; and causing the notification to be transmitted responsive to determining that the another user has failed to open the file, the notification informing the user that the another user has failed to open the file.

Example 7

The computing system according to any of Examples 1-6, the acts further comprising: receiving, from the client computing device, a request to filter files hosted by the file hosting application, the request to filter the files comprises an identity of the user and a meeting object filter request; and transmitting results to the client computing device based upon the request, the results comprise files labeled as being accessible to the user that are linked to meeting objects generated by the scheduling application.

Example 8

The computing system according to Example 7, wherein the results fail to include files that are not linked to any meeting objects generated by the scheduling application.

Example 9

The computing system according to any of Examples 1-7, the acts further comprising: at the threshold time prior to the time when the meeting represented by the meeting object is to occur, determining that a task assigned to the file is open; and causing the notification to be transmitted responsive to determining that the task assigned to the file is open, the notification indicating to the user that the task assigned to the file is open.

Example 10

The computing system according to Example 9, wherein the task is assigned to the user, the notification indicating to the user that the task is assigned to the user.

Example 11

A method executed at a file hosting server that executes a file hosting application, the method comprising: receiving, from a scheduling application executing on a server computing device: an identity of a file referenced in a meeting object generated by way of the scheduling application, the meeting object representative of a meeting that includes attendees, the file hosted at the file hosting server; identities of attendees in the meeting object; and a time specified in the meeting object, the time indicating when the meeting represented by the meeting object is to begin; assigning metadata to the file that is hosted at the file hosting server, the metadata comprises the identity of the file, the identities of the attendees in the meeting object, and the time specified in the meeting object; and at a threshold time prior to the time specified in the meeting object, causing a notification to be transmitted to a client computing device, wherein credentials of an attendee in the attendees have been received from the client computing device, and wherein the notification is caused to be transmitted to the client computing device based upon the metadata assigned to the file at the file hosting server.

Example 12

The method according to Example 11, further comprising: monitoring accesses of the file at the file hosting server; and at the threshold time prior to the time specified in the meeting object, and based upon monitoring of the accesses of the file at the file hosting server, determining that the attendee has failed to review the file, wherein the notification is caused to be transmitted to the client computing device based upon determining that the attendee has failed to review the file.

Example 13

The method according to Example 12, wherein the notification comprises a reminder to the attendee to review the file prior to the time specified in the meeting object.

Example 14

The method according to any of Examples 11-13, further comprising: monitoring accesses of the file at the file hosting server; and at the threshold time prior to the time specified in the meeting object, and based upon monitoring of the accesses of the file at the file hosting server, determining that another attendee in the attendees has failed to review the file, wherein the notification is caused to be transmitted to the client computing device based upon determining that the another attendee has failed to review the file.

Example 15

The method according to Example 14, wherein the notification comprises an identity of the another attendee.

Example 16

The method according to any of Examples 11-15, wherein the attendee is identified as an organizer of the meeting in the meeting object, and wherein the notification comprises a link that, when selected, causes the client computing device to present the meeting object to the attendee.

Example 17

The method according to any of Examples 11-16, further comprising: at the threshold time prior to the time specified in the meeting object, determining that the file hosted at the file hosting server has a task assigned thereto, the task identified as being open, wherein the notification is caused to be transmitted based upon determining that the file hosted at the file hosting server has the task assigned thereto and that the task is identified as being open.

Example 18

The method according to Example 17, wherein the task further indicates that the attendee is to complete the task.

Example 19

The method according to any of Examples 11-17, further comprising: responsive to assigning the metadata to the file, updating an activity feed for the file to indicate that the file is linked to the meeting object, wherein the activity feed comprises a plurality of entries that are representative of a respective plurality of activities undertaken with respect to the file, the entries arranged based upon times assigned to the entries, the activity feed updated to include an entry that corresponds to the meeting object.

Example 20

A computer-readable storage medium comprising instructions that, when executed by a processor, cause the processor to perform acts comprising: at a file hosting server that executes a file hosting application, receiving data from a scheduling application that executes on another server computing device, the file hosting application provides access to files hosted at the file hosting server, the data comprises: an identity of a meeting object created by the scheduling application, the meeting object representative of a meeting that is to be attended by attendees; an identity of a file referenced in the meeting object, the file hosted by the file hosting server and accessible by way of the file hosting application; identities of the attendees specified in the meeting object; and a time specified in the meeting object, the meeting is to begin at the time specified in the meeting object; at the file hosting server, in response to receiving the data, correlating the meeting object with the file; and responsive to correlating the meeting object with the file, updating an activity feed for the file for each attendee in the attendees, wherein when a user who is identified as an attendee in the meeting object is presented with the activity feed, the activity feed includes an entry that corresponds to the meeting object, and wherein when a user who is not identified as an attendee in the meeting object is presented with the activity feed, the activity feed fails to include the entry that corresponds to the meeting object.

Example 21

A computing system comprising: means for receiving, from a scheduling application executing on a server computing device: an identity of a file referenced in a meeting object generated by way of the scheduling application, the meeting object representative of a meeting that includes attendees, the file hosted at the file hosting server; identities of attendees in the meeting object; and a time specified in the meeting object, the time indicating when the meeting represented by the meeting object is to begin; means for assigning metadata to the file that is hosted at the file hosting server, the metadata comprises the identity of the file, the identities of the attendees in the meeting object, and the time specified in the meeting object; and means for causing a notification to be transmitted to a client computing device at a threshold time prior to the time specified in the meeting object, wherein credentials of an attendee in the attendees have been received from the client computing device, and wherein the notification is caused to be transmitted to the client computing device based upon the metadata assigned to the file at the file hosting server.

Figure 17:
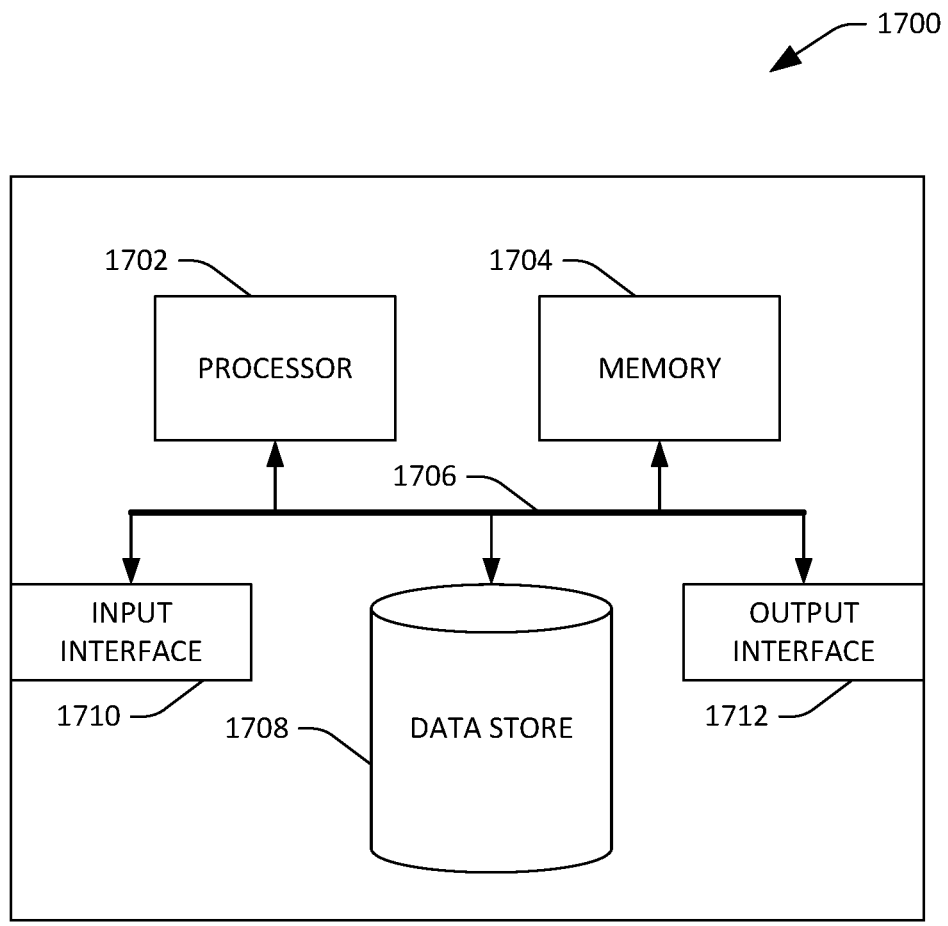
FIG. 17 is an exemplary computing system.

Referring now to FIG. 17, a high-level illustration of an exemplary computing device 1700 that can be used in accordance with the systems and methodologies disclosed herein is illustrated. For instance, the computing device 1700 may be used in a system that identifies that a meeting object includes a reference to a file hosted by a file hosting server. By way of another example, the computing device 1700 can be used in a system that causes notifications to be transmitted about a hosted file. The computing device 1700 includes at least one processor 1702 that executes instructions that are stored in a memory 1704. The instructions may be, for instance, instructions for implementing functionality described as being carried out by one or more components discussed above or instructions for implementing one or more of the methods described above. The processor 1702 may access the memory 1704 by way of a system bus 1706.

In addition to storing executable instructions, the memory 1704 may also store meeting objects, hosted files, etc.

The computing device 1700 additionally includes a data store 1708 that is accessible by the processor 1702 by way of the system bus 1706. The data store 1708 may include executable instructions, meeting objects, hosted files, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc. by way of the output interface 1712.

It is contemplated that the external devices that communicate with the computing device 1700 via the input interface 1710 and the output interface 1712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1700 may be a distributed system. Thus, for instance, several devices may be in communication by way of a network connection and may collectively perform tasks described as being performed by the computing device 1700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed at a file hosting server that executes a file hosting application, the method comprising:
   receiving, from a scheduling application executing on a server computing device:
      an identity of a file referenced in a meeting object generated by way of the scheduling application, the meeting object representative of a meeting that includes attendees, the file hosted at the file hosting server;
      identities of attendees in the meeting object; and
      a time specified in the meeting object, the time indicating when the meeting represented by the meeting object is to begin;
   updating an activity feed for the file at the file hosting server, wherein the activity feed includes entries that represent activities undertaken with respect to the file over time, wherein updating the activity feed comprises adding an entry in the activity feed, the entry includes a link to the meeting object such that when the link is selected in the entry of the activity feed the meeting object is presented on a display.

2. The method of claim 1, further comprising:
   monitoring accesses of the file at the file hosting server;
   based upon the monitoring of the accesses of the file at the file hosting server, determining that an attendee in the attendees has failed to review the file;
   responsive to determining that the attendee in the attendees has failed to review the file, transmitting a notification to a client computing device that is operated by the attendee, wherein the notification indicates that the attendee has failed to review the file.

3. The method of claim 2, further comprising:
   determining that the file hosted at the file hosting server has a task assigned thereto, the task identified as being open, wherein the notification indicates that the file hosted at the file hosting server has the task assigned thereto and that the task is identified as being open.

4. The method of claim 3, wherein the notification further indicates that the attendee is to complete the task.

5. The method of claim 2, wherein the notification comprises an identity of the attendee.

6. The method of claim 2, wherein the attendee is identified as an organizer of the meeting in the meeting object, and wherein the notification comprises a link that, when selected, causes the client computing device to present the meeting object to the attendee.

7. The method of claim 1, wherein
the entries are arranged based upon times assigned to the entries.

8. A computing system comprising:
at least one processor; and
memory that has a file hosting application loaded therein, wherein the at least one processor, when executing the file hosting application, is configured to perform acts comprising:
   receiving data generated by a scheduling application, the data indicates that a file hosted by the file hosting application is referenced in a meeting object generated by the scheduling application, the data comprises:
     identities of users referenced in the meeting object;
     an identity of the file hosted by the file hosting application referenced in the meeting object; and
     a time when a meeting represented by the meeting object is to occur;
   responsive to receiving the data, updating an activity feed for the file at the file hosting server, wherein the activity feed includes entries that represent activities undertaken with respect to the file over time, wherein updating the activity feed comprises adding an entry in the activity feed, the entry includes a link to the meeting object such that when the link is selected in the entry of the activity feed the meeting object is presented on a display.

9. The computing system of claim 8, wherein the entry indicates that the file is referenced in the meeting object.

10. The computing system of claim 9, the acts further comprising:
detecting selection of the link in the entry; and
responsive to detecting selection of the link, transmitting selection data to the scheduling application, wherein the scheduling application, responsive to receiving the selection data, causes the meeting object to be presented on the display.

11. The computing system of claim 9, wherein the entries in the activity feed are arranged chronologically, and wherein the entry is placed in the activity feed based upon the time when the meeting represented by the meeting object is to occur.

12. The computing system of claim 8, the acts further comprising:
receiving, from a client computing device, a request to filter files hosted by the file hosting application, the request to filter the files comprises an identity of a user and a meeting object filter request; and
transmitting results to the client computing device based upon the request, the results comprise files labeled as being accessible to the user that are linked to meeting objects generated by the scheduling application.

13. The computing system of claim 12, wherein the results fail to include files that are not linked to any meeting objects generated by the scheduling application.

14. The computing system of claim 8, the acts further comprising:
at a threshold time prior to the time when the meeting represented by the meeting object is to occur, determining that a task assigned to the file is open; and
responsive to determining that the task assigned to the file is open, transmitting a notification to a client computing device, the notification indicates that the task assigned to the file is open.

15. The computing system of claim 14, wherein the task is assigned to a user that is operating the client computing device, the notification indicating to the user that the task is assigned to the user.

16. The computing system of claim 8, the acts further comprising:
at a threshold time prior to the time when the meeting represented by the meeting object is to occur, determining that a user in the users has failed to open the file hosted by the file hosting application; and
responsive to determining that the user has failed to open the file hosted by the file hosting application, causing a reminder to be transmitted to a client computing device operated by the user, the reminder configured to remind the user to open the file prior to the time when the meeting is to occur.

17. A computer-readable storage medium comprising instructions that, when executed by a processor, cause the processor to perform acts comprising:
at a file hosting server that executes a file hosting application, receiving data from a scheduling application that executes on another server computing device, the file hosting application provides access to files hosted at the file hosting server, the data comprises:
   an identity of a meeting object created by the scheduling application, the meeting object representative of a meeting that is to be attended by attendees;
   an identity of a file referenced in the meeting object, the file hosted by the file hosting server and accessible by way of the file hosting application;
   identities of the attendees specified in the meeting object; and
   a time specified in the meeting object, the meeting is to begin at the time specified in the meeting object;
at the file hosting server, in response to receiving the data, updating an activity feed for the file at the file hosting server, wherein the activity feed includes entries that represent activities undertaken with respect to the file over time, wherein updating the activity feed comprises adding an entry in the activity feed, the entry includes a link to the meeting object such that when the link is selected in the entry of the activity feed the meeting object is presented on a display.

18. The computer-readable storage medium of claim 17, wherein
the activity feed for the file is updated for each attendee in the attendees, wherein when a user who is identified as an attendee in the meeting object is presented with the activity feed, the activity feed includes the entry that corresponds to the meeting object, and wherein when a user who is not identified as an attendee in the meeting object is presented with the activity feed, the activity feed fails to include the entry that corresponds to the meeting object.

19. The computer-readable storage medium of claim 18, wherein the entries in the activity feed are arranged chronologically, and further wherein the entry is placed in the activity feed based upon the time when the meeting represented by the meeting object is to begin.

20. The computer-readable storage medium of claim 17, the acts further comprising:

responsive to detecting selection of the link, transmitting selection data to the scheduling application, wherein the scheduling application, responsive to receiving the selection data, causes the meeting object to be presented on the display.

\* \* \* \* \*